US012647225B2

(12) United States Patent
Yu

(10) Patent No.: US 12,647,225 B2
(45) Date of Patent: Jun. 2, 2026

(54) MULTI-RESOURCE-UNIT TRANSMISSION INDICATION METHOD, AND RELATED DEVICE

(71) Applicant: HUAWEI TECHNOLOGIES CO., LTD., Shenzhen (CN)

(72) Inventor: Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 642 days.

(21) Appl. No.: 17/986,511

(22) Filed: Nov. 14, 2022

(65) Prior Publication Data

US 2023/0110435 A1 Apr. 13, 2023

Related U.S. Application Data

(63) Continuation of application No. PCT/CN2021/103121, filed on Jun. 29, 2021.

(30) Foreign Application Priority Data

Jun. 30, 2020 (CN) .......................... 202010615549.7

(51) Int. Cl.
*H04L 5/00* (2006.01)
*H04W 72/044* (2023.01)
(52) U.S. Cl.
CPC .......... *H04L 5/0044* (2013.01); *H04L 5/0094* (2013.01); *H04W 72/044* (2013.01)
(58) Field of Classification Search
CPC ... H04L 5/0044; H04L 5/0094; H04L 5/0007; H04L 5/0053; H04W 72/044; H04W 84/12; H04W 72/0453; H04W 72/53
See application file for complete search history.

(56) References Cited

U.S. PATENT DOCUMENTS

2019/0041509 A1* 2/2019 Jiang ..................... H04W 24/10
2019/0281614 A1 9/2019 Chen et al.
(Continued)

FOREIGN PATENT DOCUMENTS

CN 110730050 A 1/2020
CN 110768757 A 2/2020
CN 111279646 A 6/2020

OTHER PUBLICATIONS

IEEE 802.11-20/0413r1, Insun Jang et al., Discussion on EHT Trigger based UL Mu, Mar. 2020, 13 pages.
(Continued)

*Primary Examiner* — Chuong M Nguyen

(57) ABSTRACT

Embodiments of this application disclose a multi-resource-unit transmission indication method, and a related device. The method includes: A first device generates an EHT TB PPDU, where the EHT TB PPDU includes a resource unit indication field, the resource unit indication field is used to indicate a first resource unit used by the first device to transmit the EHT TB PPDU, and the first resource unit is included in a resource unit allocated to the first device; and the first device sends the EHT TB PPDU to a second device. In the embodiments of this application, the RU used by the first device to actually transmit the EHT TB PPDU can be indicated. The technical solution provided in this application may be applied to an 802.11ax Wi-Fi system, an 802.11be Wi-Fi system, or the like.

19 Claims, 25 Drawing Sheets

| AP | Trigger frame (Trigger frame) | | Multi-user block acknowledgement (M-BA) frame |

| STA 1 | | High efficiency trigger-based physical layer protocol data unit (HE TB PPDU) | |

| STA 2 | | HE TB PPDU | |

(56) References Cited

U.S. PATENT DOCUMENTS

| | | | | |
|---|---|---|---|---|
| 2021/0044398 A1* | 2/2021 | Noh | .................... | H04L 1/0041 |
| 2021/0045151 A1* | 2/2021 | Chen | ................. | H04L 27/2602 |
| 2021/0351894 A1* | 11/2021 | Lin | ...................... | H04L 5/0094 |
| 2022/0124507 A1* | 4/2022 | Ryu | ..................... | H04L 5/0053 |
| 2022/0255681 A1* | 8/2022 | Huang | ................. | H04L 1/1685 |
| 2022/0278877 A1* | 9/2022 | Park | ................... | H04L 27/2603 |
| 2022/0278883 A1* | 9/2022 | Park | ........................ | H04L 5/00 |
| 2022/0295468 A1* | 9/2022 | Huang | ................. | H04W 72/20 |
| 2022/0338057 A1* | 10/2022 | Shellhammer | ........ | H04L 5/0094 |

OTHER PUBLICATIONS

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.
IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

* cited by examiner tone: Subcarrier
RU: Resource unit
Guard: Guard subcarrier
DC: Direct current subcarrier tone: Subcarrier
RU: Resource unit
Guard: Guard subcarrier
DC: Direct current subcarrier

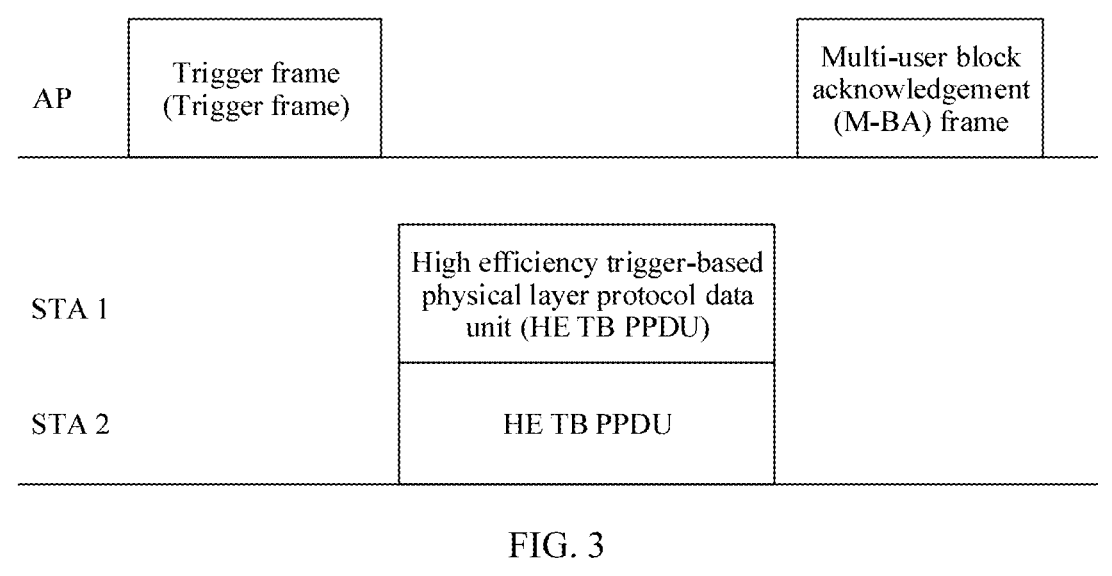

| AP | Trigger frame (Trigger frame) | | Multi-user block acknowledgement (M-BA) frame |

| STA 1 | | High efficiency trigger-based physical layer protocol data unit (HE TB PPDU) | |

| STA 2 | | HE TB PPDU | |

FIG. 3

Figure 4:
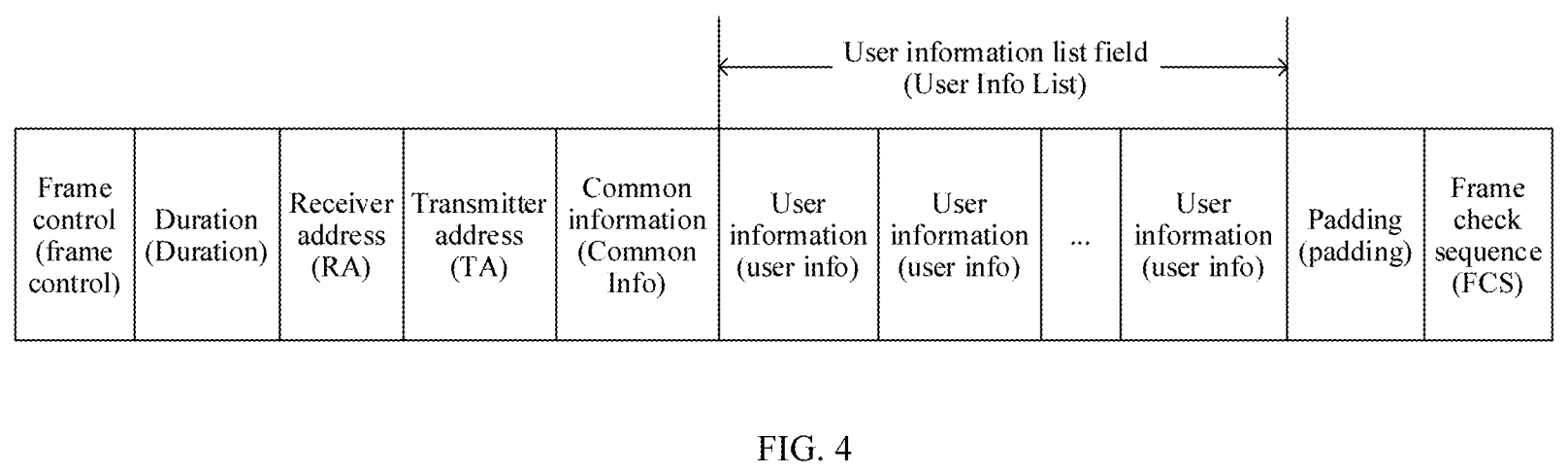

| Frame control (frame control) | Duration (Duration) | Receiver address (RA) | Transmitter address (TA) | Common information (Common Info) | User information (user info) | User information (user info) | ... | User information (user info) | Padding (padding) | Frame check sequence (FCS) |
|---|---|---|---|---|---|---|---|---|---|---|

User information list field (User Info List)

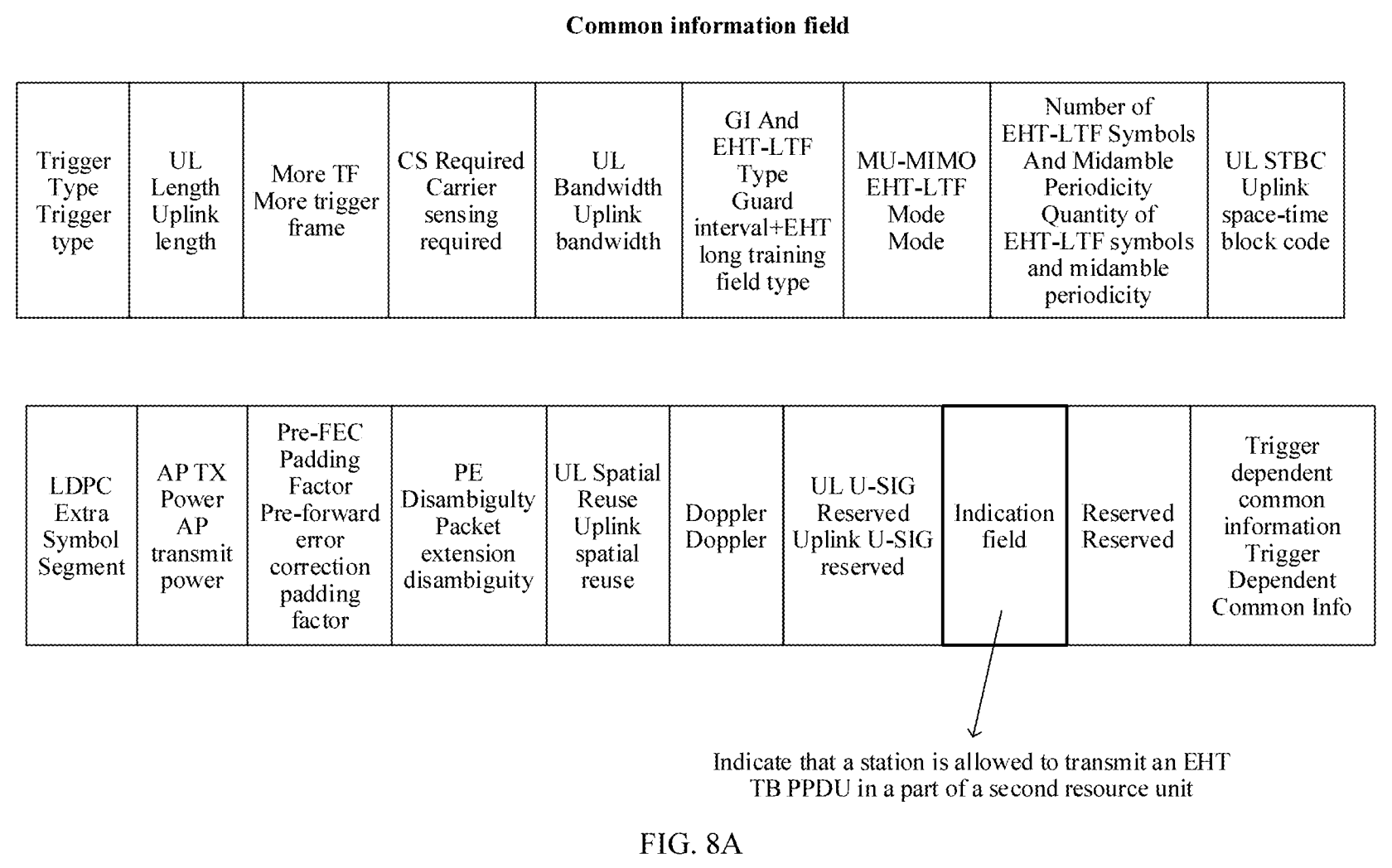

Common information field

| Trigger Type Trigger type | UL Length Uplink length | More TF More trigger frame | CS Required Carrier sensing required | UL Bandwidth Uplink bandwidth | GI And EHT-LTF Type Guard interval+EHT long training field type | MU-MIMO EHT-LTF Mode Mode | Number of EHT-LTF Symbols And Midamble Periodicity Quantity of EHT-LTF symbols and midamble periodicity | UL STBC Uplink space-time block code |
|---|---|---|---|---|---|---|---|---|

| LDPC Extra Symbol Segment | AP TX Power AP transmit power | Pre-FEC Padding Factor Pre-forward error correction padding factor | PE Disambiguilty Packet extension disambiguity | UL Spatial Reuse Uplink spatial reuse | Doppler Doppler | UL U-SIG Reserved Uplink U-SIG reserved | Indication field | Reserved Reserved | Trigger dependent common information Trigger Dependent Common Info |
|---|---|---|---|---|---|---|---|---|---|

Indicate that a station is allowed to transmit an EHT TB PPDU in a part of a second resource unit

FIG. 8A

| Resource unit indication field (RU allocation/ bitmap) | Modulation and coding scheme field (MCS) | ⋮ | Cyclic redundancy code (CRC) | Frame trailer (Tail) |
|---|---|---|---|---|

| Extremely high throughput short training field (EHT-STF) | Extremely high throughput long training field (EHT-LTF) | Extremely high throughput signal field (EHT-SIG) | Data (Data) (STA 1) | Packet extension (PE) |
| Extremely high throughput short training field (EHT-STF) | Extremely high throughput long training field (EHT-LTF) | Extremely high throughput signal field (EHT-SIG) | Data (Data) (STA 2) | Packet extension (PE) |

Universal signal field
(U-SIG)

...

Legacy signal field
(L-SIG)

Legacy long training field
(L-LTF)

Legacy short training field
(L-STF)

FIG. 9

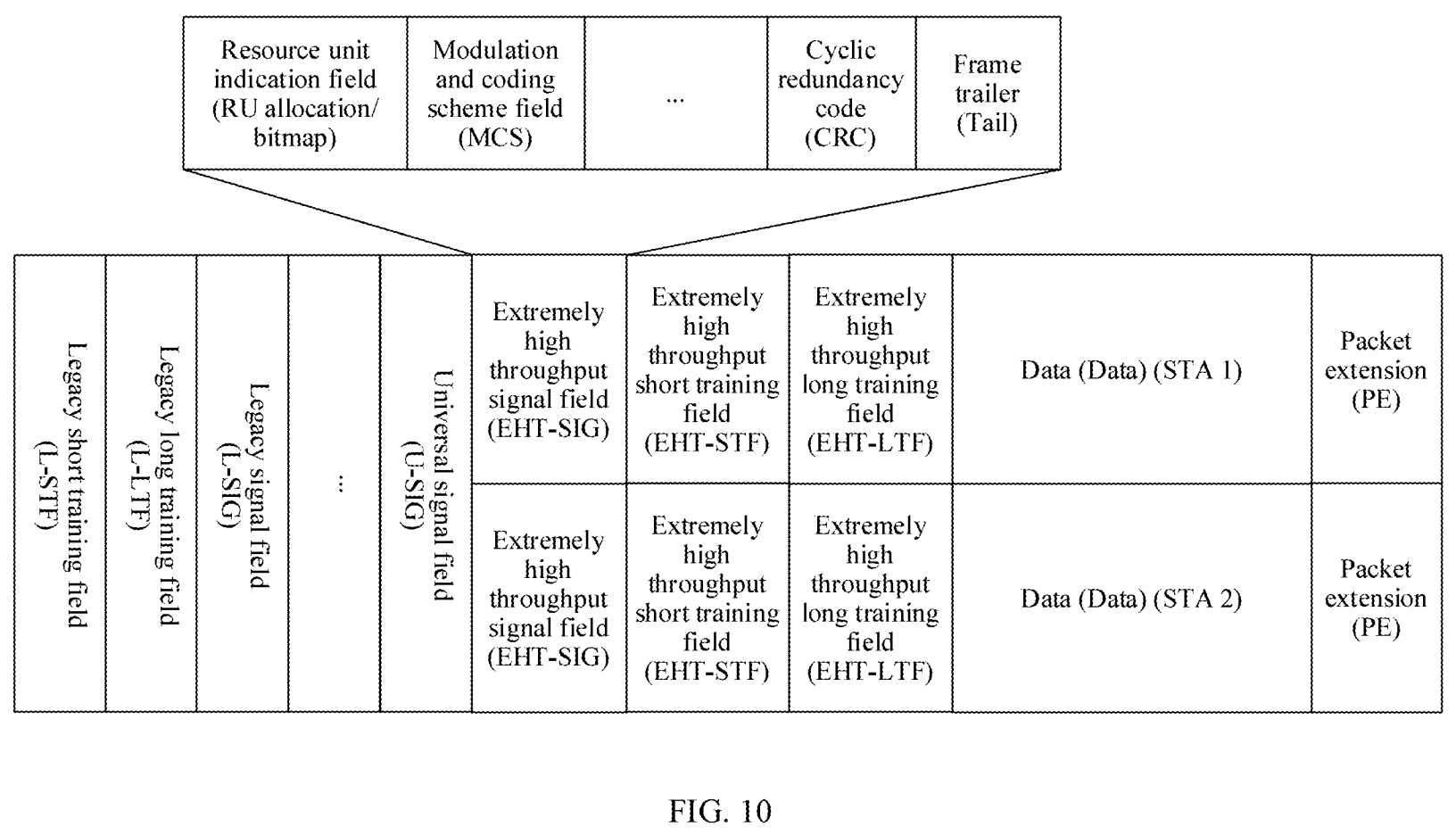

| Resource unit indication field (RU allocation/ bitmap) | Modulation and coding scheme field (MCS) | ... | Cyclic redundancy code (CRC) | Frame trailer (Tail) |
|---|---|---|---|---|

| | | | Packet extension (PE) |
|---|---|---|---|
| Extremely high throughput signal field (EHT-SIG) | Extremely high throughput short training field (EHT-STF) | Extremely high throughput long training field (EHT-LTF) | Data (Data) (STA 1) |
| Extremely high throughput signal field (EHT-SIG) | Extremely high throughput short training field (EHT-STF) | Extremely high throughput long training field (EHT-LTF) | Data (Data) (STA 2) | Packet extension (PE) |

Universal signal field
(U-SIG)

...

Legacy signal field
(L-SIG)

Legacy long training field
(L-LTF)

Legacy short training field
(L-STF)

FIG. 10

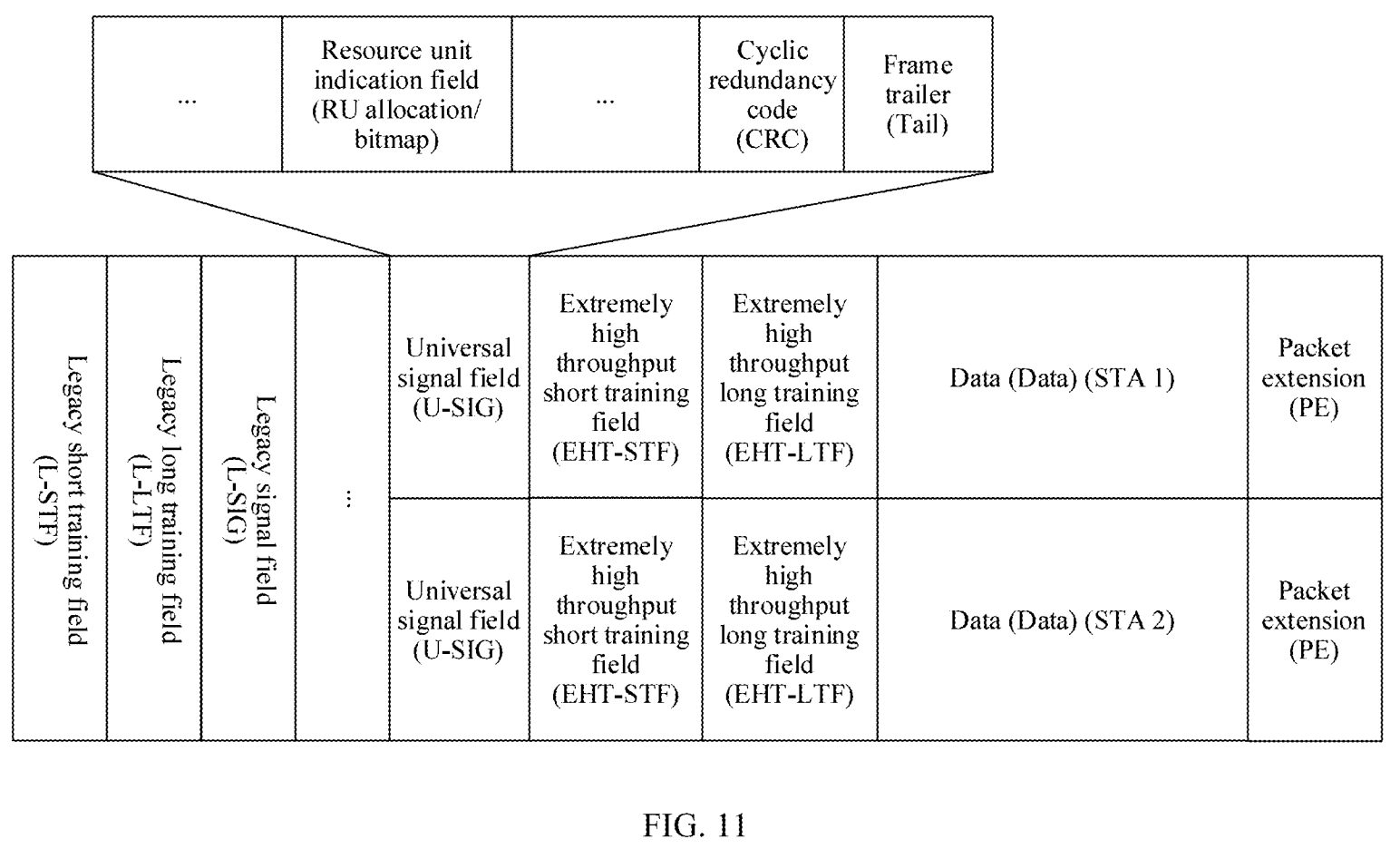

| | | | | |
|---|---|---|---|---|
| Resource unit indication field (RU allocation/ bitmap) | ... | Cyclic redundancy code (CRC) | Frame trailer (Tail) | |

| | | | | | | |
|---|---|---|---|---|---|---|
| Legacy short training field (L-STF) | | | | | | |
| Legacy long training field (L-LTF) | | | | | | |
| Legacy signal field (L-SIG) | | | | | | |
| ... | Universal signal field (U-SIG) | Extremely high throughput short training field (EHT-STF) | Extremely high throughput long training field (EHT-LTF) | Data (Data) (STA 1) | Packet extension (PE) |
| | Universal signal field (U-SIG) | Extremely high throughput short training field (EHT-STF) | Extremely high throughput long training field (EHT-LTF) | Data (Data) (STA 2) | Packet extension (PE) |

FIG. 11

RU distribution in a 20-MHz frequency band range in 80 MHz

RU distribution in a 20-MHz frequency band range in 80 MHz

RU distribution in a 20-MHz frequency band range in 80 MHz

Combined RUs

RUs that are not combined

RU distribution in a 20-MHz frequency band range in 80 MHz

Combined RUs

RUs that are not combined

RU distribution in a 20-MHz frequency band range in 80 MHz
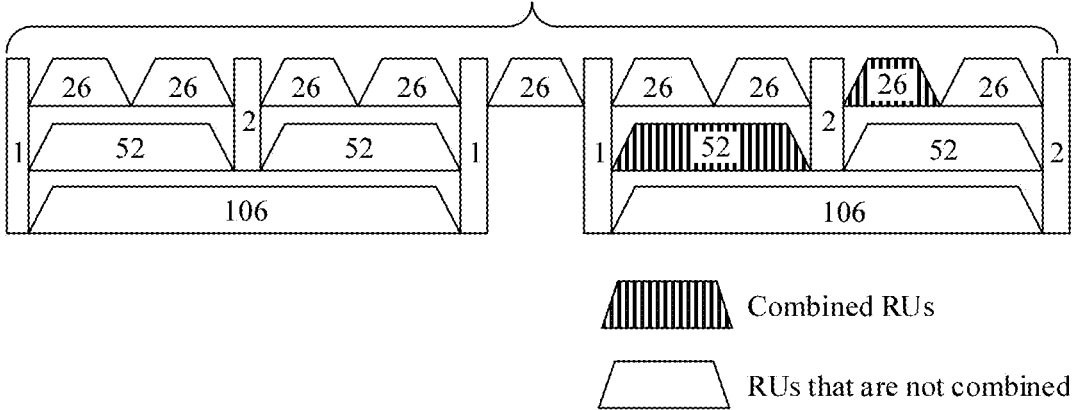
Combined RUs
RUs that are not combined
FIG. 16
RU distribution in a 20-MHz frequency band range in 80 MHz
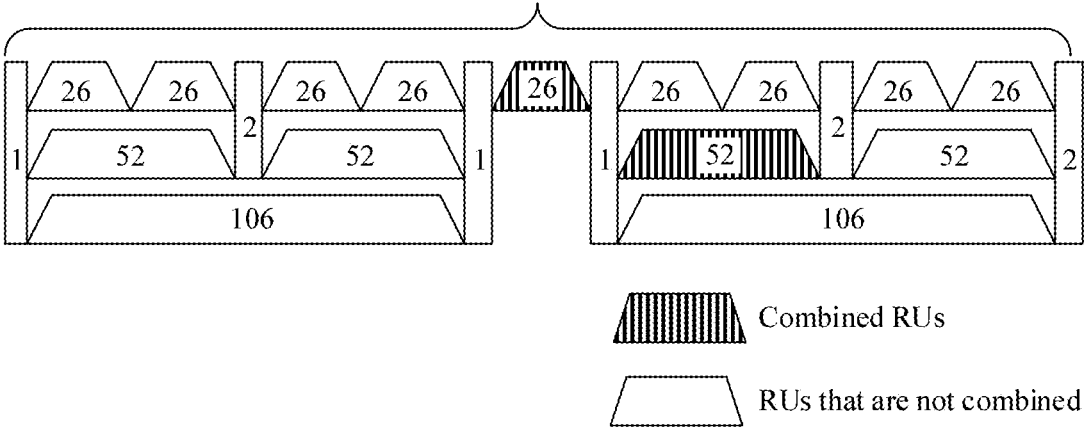
Combined RUs
RUs that are not combined
FIG. 17
RU distribution in 80 MHz
Combined RUs
RUs that are not combined
FIG. 18

| | | | |
|---|---|---|---|
| 1010 0000 0000 0000 | EHT-SIG | Data (Data) (STA 1) | PE |
| | | Data (Data) (STA 3) | PE |
| 1010 0000 0000 0000 | EHT-SIG | Data (Data) (STA 1) | PE |
| 0000 1110 0000 0000 | EHT-SIG | Data (Data) (STA 2) | PE |
| 0000 1110 0000 0000 | EHT-SIG | Data (Data) (STA 2) | PE |
| 0000 1110 0000 0000 | EHT-SIG | | |
| | | Data (Data) (STA 4) | PE |

1

MULTI-RESOURCE-UNIT TRANSMISSION INDICATION METHOD, AND RELATED DEVICE

CROSS-REFERENCE TO RELATED APPLICATIONS

This application is a continuation of International Application PCT/CN2021/103121, filed on Jun. 29, 2021, which claims priority to Chinese Patent Application No. 202010615549.7, filed on Jun. 30, 2020. The disclosures of the aforementioned applications are hereby incorporated by reference in their entireties.

TECHNICAL FIELD

This application relates to the field of communication technologies, and in particular, to a multi-resource-unit transmission indication method, and a related device.

BACKGROUND

In a conventional wireless local area network (WLAN), when each station needs to send uplink data, the station occupies, in a contention manner, an entire channel to transmit the data, causing a relatively low spectrum utilization rate. In the Institute of Electrical and Electronics Engineers (IEEE) 802.11ax protocol standard, a trigger-based and scheduling-based uplink transmission method is proposed. In this transmission method, before transmitting a high efficiency trigger-based physical layer protocol data unit (HE TB PPDU), a station performs carrier sensing on one or more 20 MHz sub-channels on which a resource unit (RU) allocated to the station is located. If detecting that a 20 MHz sub-channels in a frequency band range in which the allocated RU is located is busy, the station does not perform transmission, to prevent interference to other transmission.

With the development of wireless communication technologies, in the IEEE 802.11be protocol standard, a plurality of RUs are allowed to be allocated to a same user. To further improve a spectrum utilization rate, when the plurality of RUs are allocated to the same user, before transmitting an extremely high throughput trigger-based physical layer protocol data unit (Extremely High Throughput Trigger Based Physical layer Protocol Data Unit, EHT TB PPDU), a station may select, for transmission, an idle RU in the plurality of RUs allocated to the station. How to indicate the RU used by the station to actually transmit the EHT TB PPDU is a problem to be urgently resolved by a person skilled in the art.

SUMMARY

Embodiments of this application provide a multi-resource-unit transmission indication method, and a related device, to indicate an RU used by a station to actually transmit an EHT TB PPDU.

According to a first aspect, an embodiment of this application provides a multi-resource-unit transmission indication method. The method includes: A first device generates an EHT TB PPDU, where the EHT TB PPDU includes a resource unit indication field, the resource unit indication field is used to indicate a first resource unit used by the first device to transmit the EHT TB PPDU, the first resource unit is included in a second resource unit, and the second resource unit is one or more resource units allocated to the first device; and the first device sends the EHT TB PPDU to a second device. In this way, the RU used by the first device to actually transmit the EHT TB PPDU can be indicated by using the EHT TB PPDU.

With reference to the first aspect, in a possible implementation, the EHT TB PPDU includes a universal signal field U-SIG, and the resource unit indication field is located in the U-SIG of the EHT TB PPDU. In this manner, uplink multi-user multiple-input multiple-output transmission can be supported. Because the EHT-LTF supports channel estimation of a plurality of spatial streams, the EHT-LTF also supports sending that is of the EHT-SIG and that is based on the plurality of spatial streams, and no mutual interference is caused. Therefore, EHT-SIGs sent by a plurality of MU-MIMO users are not mixed together.

With reference to the first aspect, in a possible implementation, the EHT TB PPDU includes a U-SIG, a high efficiency short training field EHT-STF, and a high efficiency signal field EHT-SIG, the resource unit indication field is located in the EHT-SIG, and the EHT-SIG is located between the U-SIG and the EHT-STF. In this manner, a position of each field in the EHT TB PPDU is the same as that in an EHT TB PPDU of another type. The PPDUs may use a similar receiving process, thereby simplifying a processing process and reducing complexity.

With reference to the first aspect, in a possible implementation, the EHT TB PPDU includes a high efficiency long training field EHT-LTF, a high efficiency signal field EHT-SIG, and a data field, the resource unit indication field is located in the EHT-SIG, and the EHT-SIG is located between the EHT-LTF and the data field. In this manner, overheads of the EHT-SIG field can be reduced.

With reference to the first aspect, in a possible implementation, before the first device generates the extremely high throughput trigger-based physical layer protocol data unit EHT TB PPDU, the method further includes: The first device receives a trigger frame sent by the second device, where the trigger frame includes a common information field and a user information field that is the same as an association identifier of the first device, the user information field is used to indicate the second resource unit, the common information field or the user information field includes an indication field, and the indication field is used to indicate that the first device is allowed to transmit the EHT TB PPDU in a part of the second resource unit.

With reference to the first aspect, in a possible implementation, the first device pre-stores an index table, and the index table is used to indicate a correspondence between a value of the resource unit indication field and the first resource unit.

With reference to the first aspect, in a possible implementation, the first resource unit indicated by the resource unit indication field is any one of the following resource units: any 26-subcarrier tone resource unit in an 80-MHz frequency band range; any 52-tone resource unit in an 80-MHz frequency band range; any 106-tone resource unit in an 80-MHz frequency band range; any 242-tone resource unit in an 80-MHz frequency band range; any 484-tone resource unit in an 80-MHz frequency band range; and any 996-tone resource unit corresponding to an 80-MHz frequency band range.

With reference to the first aspect, in a possible implementation, the first resource unit indicated by the resource unit indication field is a plurality of resource units corresponding to any one of the following combinations: a combination of a 106-tone resource unit having a lowest frequency in a 20-MHz frequency band range in an 80-MHz frequency band range and a center 26-tone resource unit in the 20-MHz frequency band range; a combination of a 106-tone resource unit having a highest frequency in a 20-MHz frequency band range in an 80-MHz frequency band range and a center 26-tone resource unit in the 20-MHz frequency band range; a combination of a 52-tone resource unit having a second lowest frequency in a 20-MHz frequency band range in an 80-MHz frequency band range and a 26-tone resource unit that is on a same side with and adjacent to the 52-tone resource unit and that is in the 20-MHz frequency band range; a combination of a 52-tone resource unit having a second lowest frequency in a 20-MHz frequency band range in an 80-MHz frequency band range and a center 26-tone resource unit in the 20-MHz frequency band range; a combination of a 52-tone resource unit having a second highest frequency in a 20-MHz frequency band range in an 80-MHz frequency band range and a 26-tone resource unit that is on a same side with and adjacent to the 52-tone resource unit and that is in the 20-MHz frequency band range; a combination of a 52-tone resource unit having a second highest frequency in a 20-MHz frequency band range in an 80-MHz frequency band range and a center 26-tone resource unit in the 20-MHz frequency band range; a combination of a 484-tone resource unit in an 80-MHz frequency band range and a 242-tone resource unit adjacent to the 484-tone resource unit; a combination of a 484-tone resource unit in an 80-MHz frequency band range and a 242-tone resource unit that is not adjacent to the 484-tone resource unit; a combination of two 242-tone resource units on two sides in an 80-MHz frequency band range; a combination of a 996-tone resource unit corresponding to an 80-MHz frequency band range and a 484-tone resource unit that is in an 80-MHz frequency band range adjacent to the 996-tone resource unit and that is not adjacent to the 996-tone resource unit; a combination of a 996-tone resource unit corresponding to an 80-MHz frequency band range, and a 484-tone resource unit and a 242-tone resource unit that are in an 80-MHz frequency band range adjacent to the 996-tone resource unit and that are not adjacent to the 996-tone resource unit; and a combination of a 484-tone resource unit and a 242-tone resource unit in an 80-MHz frequency band range, and a 484-tone resource unit and a 242-tone resource unit in an 80-MHz frequency band range adjacent to the 80-MHz frequency band range.

With reference to the first aspect, in a possible implementation, the EHT TB PPDU further includes a frequency band range indication field, the frequency band range indication field is used to indicate a frequency position of the 80-MHz frequency band range in a bandwidth, and the 80-MHz frequency band range is any one of the following: primary 80 MHz, secondary 80 MHz, 80 MHz having a lower frequency in secondary 160 MHz, and 80 MHz having a higher frequency in the secondary 160 MHz.

With reference to the first aspect, in a possible implementation, the first resource unit indicated by the resource unit indication field is a plurality of resource units corresponding to any one of the following combinations: a combination of two 996-tone resource units in a 320-MHz frequency band range; a combination of four 996-tone resource units in a 320-MHz frequency band range; a combination of two 996-tone resource units having lowest frequencies and a 996-tone resource unit having a highest frequency in a 320-MHz frequency band range; a combination of a 996-tone resource unit having a lowest frequency and two 996-tone resource units having highest frequencies in a 320-MHz frequency band range; a combination of three 996-tone resource units having lowest frequencies in a 320-MHz frequency band range; and a combination of three 996-tone resource units having highest frequencies in a 320-MHz frequency band range.

With reference to the first aspect, in a possible implementation, the resource unit indication field includes bits of a first preset length, and a position of one of the bits in the bits corresponds to a position of a unit channel in a total channel.

With reference to the first aspect, in a possible implementation, the resource unit indication field includes bits of a second preset length, and a position of one of the bits in the bits corresponds to a position of a unit channel in a frequency band range corresponding to the second resource unit.

With reference to the first aspect, in a possible implementation, when the one bit is a first value, the unit channel corresponding to the one bit is included in a channel corresponding to the first resource unit; or when the one bit is a second value, the unit channel corresponding to the one bit is not included in a channel corresponding to the first resource unit.

With reference to the first aspect, in a possible implementation, the resource unit indication field includes bits of a third preset length, and a position of one of the bits in the bits corresponds to a position of a resource unit in the second resource unit.

With reference to the first aspect, in a possible implementation, when the one bit is a first value, the resource unit corresponding to the one bit is included in the first resource unit; or when the one bit is a second value, the resource unit corresponding to the one bit is not included in the first resource unit.

According to a second aspect, this application provides a communication apparatus. The communication apparatus includes a generation unit and a sending unit. The generation unit is configured to generate an EHT TB PPDU, where the EHT TB PPDU includes a resource unit indication field, the resource unit indication field is used to indicate a first resource unit used by the communication apparatus to transmit the EHT TB PPDU, the first resource unit is included in a second resource unit, and the second resource unit is one or more resource units allocated to the communication apparatus; and the sending unit is configured to send the EHT TB PPDU to a second device. This communication apparatus may notify, by using the EHT TB PPDU, the second device of the RU used by the communication apparatus to actually transmit the EHT TB PPDU.

With reference to the second aspect, in a possible implementation, the EHT TB PPDU includes a U-SIG, and the resource unit indication field is located in the U-SIG of the EHT TB PPDU.

With reference to the second aspect, in a possible implementation, the EHT TB PPDU includes a U-SIG, an EHT-STF, and an EHT-SIG, the resource unit indication field is located in the EHT-SIG, and the EHT-SIG is located between the U-SIG and the EHT-STF.

With reference to the second aspect, in a possible implementation, the EHT TB PPDU includes an EHT-LTF, an EHT-SIG, and a data field, the resource unit indication field is located in the EHT-SIG, and the EHT-SIG is located between the EHT-LTF and the data field.

With reference to the second aspect, in a possible implementation, the communication apparatus further includes a receiving unit, and the receiving unit is configured to receive a trigger frame sent by the second device, where the trigger frame includes a common information field and a user information field that is the same as an association identifier of the communication apparatus, the user information field is used to indicate the second resource unit, the common information field or the user information field includes an indication field, and the indication field is used to indicate that the communication apparatus is allowed to transmit the EHT TB PPDU in a part of the second resource unit.

With reference to the second aspect, in a possible implementation, the communication apparatus further includes a storage unit, the storage unit is configured to store an index table, and the index table is used to indicate a correspondence between a value of the resource unit indication field and the first resource unit.

With reference to the second aspect, in a possible implementation, the first resource unit indicated by the resource unit indication field is any one of the following resource units: any 26-subcarrier tone resource unit in an 80-MHz frequency band range; any 52-tone resource unit in an 80-MHz frequency band range; any 106-tone resource unit in an 80-MHz frequency band range; any 242-tone resource unit in an 80-MHz frequency band range; any 484-tone resource unit in an 80-MHz frequency band range; and any 996-tone resource unit corresponding to an 80-MHz frequency band range.

With reference to the second aspect, in a possible implementation, the first resource unit indicated by the resource unit indication field is a plurality of resource units corresponding to any one of the following combinations: a combination of a 106-tone resource unit having a lowest frequency in a 20-MHz frequency band range in an 80-MHz frequency band range and a center 26-tone resource unit in the 20-MHz frequency band range; a combination of a 106-tone resource unit having a highest frequency in a 20-MHz frequency band range in an 80-MHz frequency band range and a center 26-tone resource unit in the 20-MHz frequency band range; a combination of a 52-tone resource unit having a second lowest frequency in a 20-MHz frequency band range in an 80-MHz frequency band range and a 26-tone resource unit that is on a same side with and adjacent to the 52-tone resource unit and that is in the 20-MHz frequency band range; a combination of a 52-tone resource unit having a second lowest frequency in a 20-MHz frequency band range in an 80-MHz frequency band range and a center 26-tone resource unit in the 20-MHz frequency band range; a combination of a 52-tone resource unit having a second highest frequency in a 20-MHz frequency band range in an 80-MHz frequency band range and a 26-tone resource unit that is on a same side with and adjacent to the 52-tone resource unit and that is in the 20-MHz frequency band range; a combination of a 52-tone resource unit having a second highest frequency in a 20-MHz frequency band range in an 80-MHz frequency band range and a center 26-tone resource unit in the 20-MHz frequency band range; a combination of a 484-tone resource unit in an 80-MHz frequency band range and a 242-tone resource unit adjacent to the 484-tone resource unit; a combination of a 484-tone resource unit in an 80-MHz frequency band range and a 242-tone resource unit that is not adjacent to the 484-tone resource unit; a combination of two 242-tone resource units on two sides in an 80-MHz frequency band range; a combination of a 996-tone resource unit corresponding to an 80-MHz frequency band range and a 484-tone resource unit that is in an 80-MHz frequency band range adjacent to the 996-tone resource unit and that is not adjacent to the 996-tone resource unit; a combination of a 996-tone resource unit corresponding to an 80-MHz frequency band range, and a 484-tone resource unit and a 242-tone resource unit that are in an 80-MHz frequency band range adjacent to the 996-tone resource unit and that are not adjacent to the 996-tone resource unit; a combination of a 996-tone resource unit corresponding to an 80-MHz frequency band range, and two 242-tone resource units in an 80-MHz frequency band range adjacent to the 996-tone resource unit; and a combination of a 484-tone resource unit and a 242-tone resource unit in an 80-MHz frequency band range, and a 484-tone resource unit and a 242-tone resource unit in an 80-MHz frequency band range adjacent to the 80-MHz frequency band range.

With reference to the second aspect, in a possible implementation, the EHT TB PPDU further includes a frequency band range indication field, the frequency band range indication field is used to indicate a frequency position of the 80-MHz frequency band range in a bandwidth, and the 80-MHz frequency band range is any one of the following: primary 80 MHz, secondary 80 MHz, 80 MHz having a lower frequency in secondary 160 MHz, and 80 MHz having a higher frequency in the secondary 160 MHz.

With reference to the second aspect, in a possible implementation, the first resource unit indicated by the resource unit indication field is a plurality of resource units corresponding to any one of the following combinations: a combination of two 996-tone resource units in a 320-MHz frequency band range; a combination of four 996-tone resource units in a 320-MHz frequency band range; a combination of two 996-tone resource units having lowest frequencies and a 996-tone resource unit having a highest frequency in a 320-MHz frequency band range; a combination of a 996-tone resource unit having a lowest frequency and two 996-tone resource units having highest frequencies in a 320-MHz frequency band range; a combination of three 996-tone resource units having lowest frequencies in a 320-MHz frequency band range; and a combination of three 996-tone resource units having highest frequencies in a 320-MHz frequency band range.

With reference to the second aspect, in a possible implementation, the resource unit indication field includes bits of a first preset length, and a position of one of the bits in the bits corresponds to a position of a unit channel in a total channel.

With reference to the second aspect, in a possible implementation, the resource unit indication field includes bits of a second preset length, and a position of one of the bits in the bits corresponds to a position of a unit channel in a frequency band range corresponding to the second resource unit.

With reference to the second aspect, in a possible implementation, when the one bit is a first value, the unit channel corresponding to the one bit is included in a channel corresponding to the first resource unit; or when the one bit is a second value, the unit channel corresponding to the one bit is not included in a channel corresponding to the first resource unit.

With reference to the second aspect, in a possible implementation, the resource unit indication field includes bits of a third preset length, and a position of one of the bits in the bits corresponds to a position of a resource unit in the second resource unit.

With reference to the second aspect, in a possible implementation, when the one bit is a first value, the resource unit corresponding to the one bit is included in the first resource unit; or when the one bit is a second value, the resource unit corresponding to the one bit is not included in the first resource unit.

According to a third aspect, this application provides another communication apparatus, where the communication apparatus includes a processor, a memory, and a transceiver. The transceiver is configured to send an EHT TB PPDU; the memory is configured to store program code; and the processor is configured to invoke the program code in the memory to perform the method described in any one of the first aspect or the possible implementations of the first aspect.

According to a fourth aspect, this application provides a computer-readable storage medium. The computer-readable storage medium is configured to store instructions, and when the instructions are executed, the method described in any one of the first aspect or the possible implementations of the first aspect is implemented.

According to a fifth aspect, this application provides a chip system. The chip system includes at least one processor and an interface, and is configured to support a first device in implementing a function in the first aspect, for example, receiving or processing at least one of data and information in the foregoing method. In a possible design, the chip system further includes a memory, and the memory is configured to store program instructions and data that are required by a station. The chip system may include a chip, or may include a chip and another discrete component.

In the embodiments of this application, the first device may generate the EHT TB PPDU and send the EHT TB PPDU to the second device. The EHT TB PPDU includes the resource unit indication field, the resource unit indication field may indicate the first resource unit used by the first device to transmit the EHT TB PPDU, and the first resource unit is included in the resource unit allocated to the first device. In this way, the RU used by the first device to actually transmit the EHT TB PPDU can be indicated by using the EHT TB PPDU.

BRIEF DESCRIPTION OF DRAWINGS

To describe the technical solutions in embodiments of this application more clearly, the following briefly describes the accompanying drawings used for describing the embodiments or the conventional technology.

FIG. 3 is a schematic diagram of a data transmission process according to an embodiment of this application;

FIG. 4 is a schematic diagram of a frame formant of a trigger frame according to an embodiment of this application;

FIG. 6 is a schematic flowchart of trigger-based and scheduling-based uplink transmission according to an embodiment of this application;

FIG. 8A is a schematic diagram of a frame format of a common information field in a trigger frame according to an embodiment of this application;

FIG. 9 is a schematic diagram of a frame format of an EHT TB PPDU according to an embodiment of this application;

FIG. 10 is another schematic diagram of a frame format of an EHT TB PPDU according to an embodiment of this application;

FIG. 11 is another schematic diagram of a frame format of an EHT TB PPDU according to an embodiment of this application;

FIG. 14 to FIG. 17 are schematic diagrams of some combinations of a 52-tone RU and a 26-tone RU according to an embodiment of this application;

FIG. 18 to FIG. 21 are schematic diagrams of some combinations of a 484-tone RU and a 242-tone RU according to an embodiment of this application;

DESCRIPTION OF EMBODIMENTS

The following describes the technical solutions in embodiments of this application in more detail.

The technical solutions in this application may be applied to a wireless local area network (WLAN), an Internet of Things (IOT), a vehicle-to-everything (Vehicle-to-X, V2X) network, or another network. This is not specifically limited in this application. For example, an application scenario of this application may be a WLAN based on the Institute of Electrical and Electronics Engineers (IEEE) 802.11be standard, an IoT based on the IEEE 802.11be standard, a vehicle-to-everything network based on the IEEE 802.11be standard, or another network based on the IEEE 802.11be standard, or may be a next generation WLAN based on the 802.11be, a IoT based on the next generation IEEE 802.11be standard, a vehicle-to-everything network based on the next generation IEEE 802.11be standard, or another network based on the next generation IEEE 802.11 be standard, or may be another WLAN of a future standard protocol.

Figure 1:
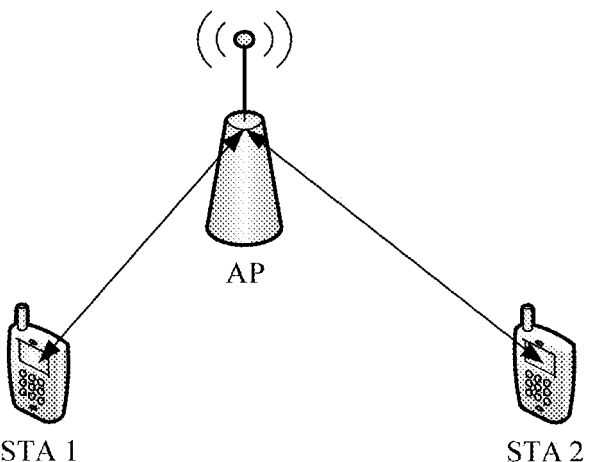
FIG. 1 is a schematic diagram of an architecture of a data communication system according to an embodiment of this application.

A data communication system provided in the embodiments of this application includes one or more access points (APs) and one or more stations (STAs). For example, FIG. 1 is a schematic diagram of an architecture of a data communication system according to an embodiment of this application. The data communication system includes an AP and two STAs, where the two STAs are a first STA (a STA 1) and a second STA (a STA 2). It should be noted that the data communication system includes at least two devices, and may include more or fewer devices than those in FIG. 1. This is not limited herein, and FIG. 1 is only used as an example. A multi-resource-unit transmission indication method provided in the embodiments of this application is applicable to data communication between an AP and a STA, for example, data communication between the STA 1 and the AP, or data communication between the STA 2 and the AP. The method is also applicable to data communication between APs, for example, data communication between the AP and another AP. The method is also applicable to data communication between STAs, for example, data communication between the STA 1 and the STA 2. The following further describes the STA and the AP.

The STA in the embodiments of this application is an apparatus having a wireless communication function, and may be user equipment, an access terminal, a user unit, a user station, a mobile station, a mobile station, a remote station, a remote terminal, a mobile device, a user terminal, a terminal, a wireless communication device, a user agent, or a user apparatus. The station may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application. For example, the access point and the station may be devices used in an Internet of Vehicles, Internet of Things nodes, sensors, or the like in an Internet of Things (IoT), smart cameras, smart remote controls, smart water or electricity meters, or the like in a smart home, or sensors in a smart city.

The station may support the 802.11be standard. The station may also support a plurality of WLAN standards of the 802.11 family such as 802.11be, 802.11ax, 802.11ac, 802.11n, 802.11g, 802.11b, and 802.11a.

The station in this application may be a high efficiency (HE) STA or an extremely high throughput (EHT) STA, or may be a STA applicable to a future Wi-Fi standard.

In the embodiments of this application, the AP may be an access point for a terminal device (such as a mobile phone) to access a wired (or wireless) network, and is mainly deployed in a home, a building, and a park. A typical coverage radius is tens of meters to hundreds of meters. Certainly, the AP may alternatively be deployed outdoors. The access point is equivalent to a bridge that connects a wired network and a wireless network. A main function of the access point is to connect various wireless network clients together and then connect the wireless network to an Ethernet. Specifically; the access point may be a terminal device (such as a mobile phone) or a network device (such as a router) with a wireless fidelity (Wi-Fi) chip. The access point may be a device that supports the 802.11be standard. Alternatively, the access point may be a device that supports a plurality of wireless local area network (WLAN) standards of the 802.11 family such as 802.11be, 802.11ax, 802.11ac, 802.11n, 802.11g, 802.11b, and 802.11a. The access point in this application may be a high efficiency (HE) AP or an extremely high throughput (EHT) AP, or may be an access point applicable to a future Wi-Fi standard.

For ease of understanding related content in the embodiments of this application, the following describes some concepts related to the embodiments of this application.

1. Resource Unit (RU)

The embodiments of this application relate to a basic frequency resource unit for dividing a frequency resource of a wireless network. An RU type mainly includes a 26-tone RU, a 52-tone RU, a 106-tone RU, a 242-tone RU, a 484-tone RU, a 996-tone RU, a 2*996-tone RU, and the like, where tone indicates a subcarrier. As the basic frequency resource unit, the RU can be allocated to different users for uplink and downlink data transmission. RUs of different sizes have different bandwidths and may carry services at different rates.

Figure 2A:
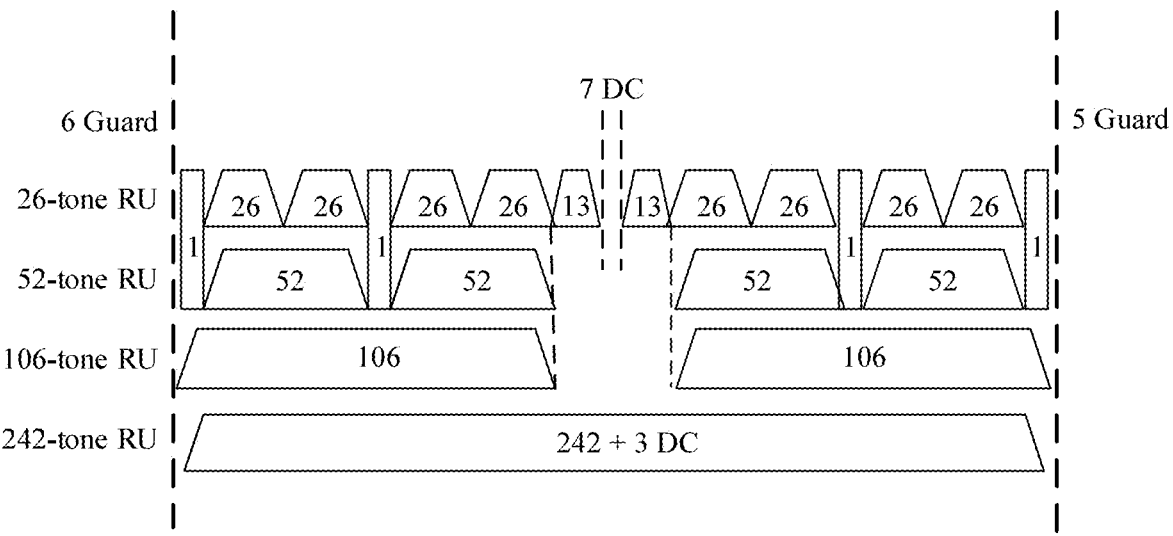
FIG. 2A is a schematic diagram of subcarrier distribution and RU distribution according to an embodiment of this application.

The following describes subcarrier distribution (Tone Plan) under different packet bandwidths. FIG. 2A is a schematic diagram of subcarrier distribution and RU distribution according to an embodiment of this application. When a bandwidth is 20 MHz, the entire bandwidth may include an entire 242-tone RU that represents an RU including 242 subcarriers. The 20-MHz bandwidth may alternatively include various combinations such as a combination of 26-tone RUs, a combination of 52-tone RUs, or a combination of 106-tone RUs. For another example, a 996-tone RU may represent an RU including 996 subcarriers. In addition to an RU used for data transmission, the bandwidth further includes some guard subcarriers, empty subcarriers (a part shown by using 1 tone in FIG. 2A), or direct current (DC) subcarriers.

Figure 2B:
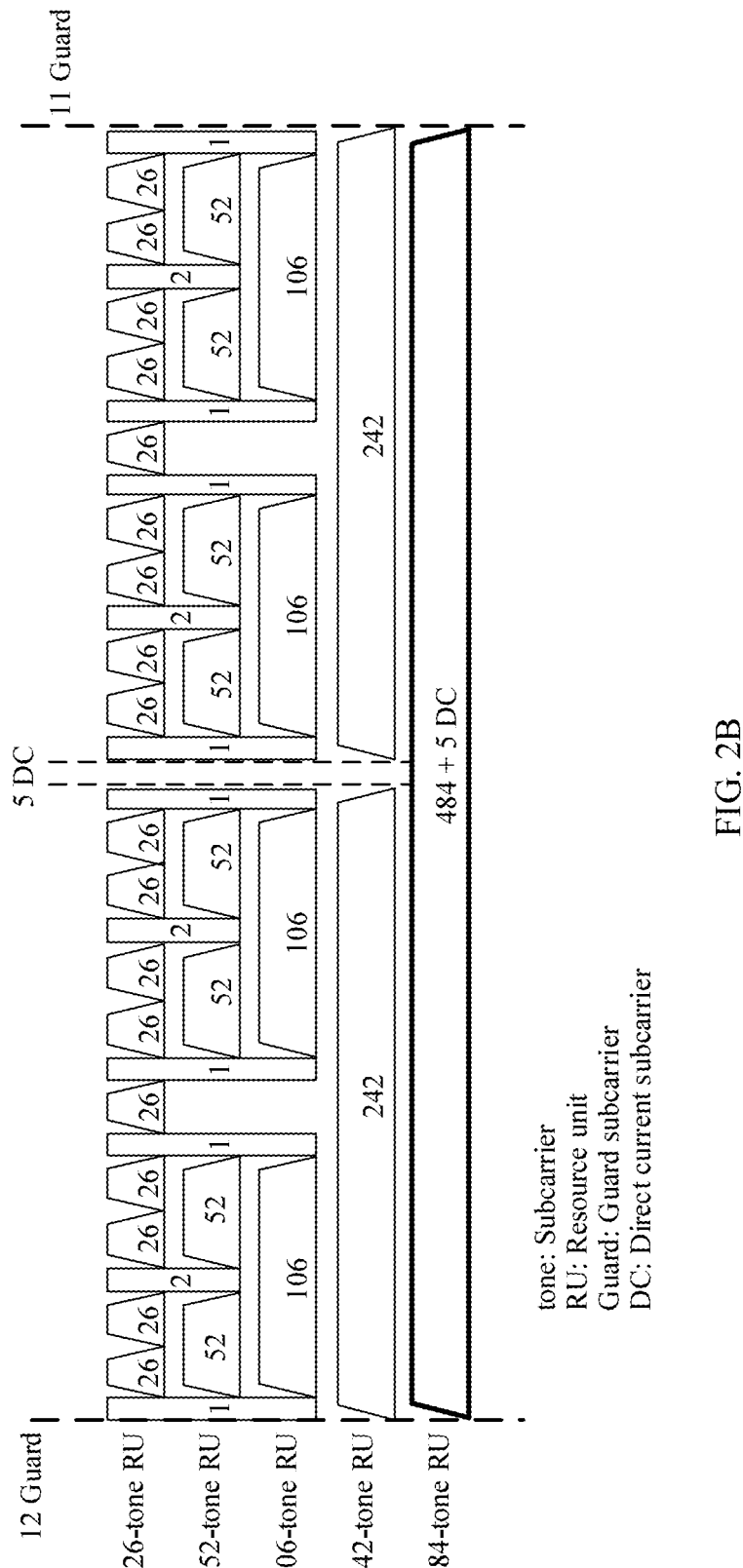
FIG. 2B is another schematic diagram of subcarrier distribution and RU distribution according to an embodiment of this application.

FIG. 2B is another schematic diagram of subcarrier distribution and RU distribution according to an embodiment of this application. When a bandwidth is 40 MHz, the entire bandwidth is approximately equivalent to a replication of the 20-MHz subcarrier distribution. The entire bandwidth may include an entire 484-tone RU, or may include various combinations such as a combination of 26-tone RUs, a combination of 52-tone RUs, a combination of 106-tone RUs, or a combination of 242-tone RUs. Empty subcarriers include parts shown by using 1 tone or 2 tones in the example shown in FIG. 2B.

Figure 2C:
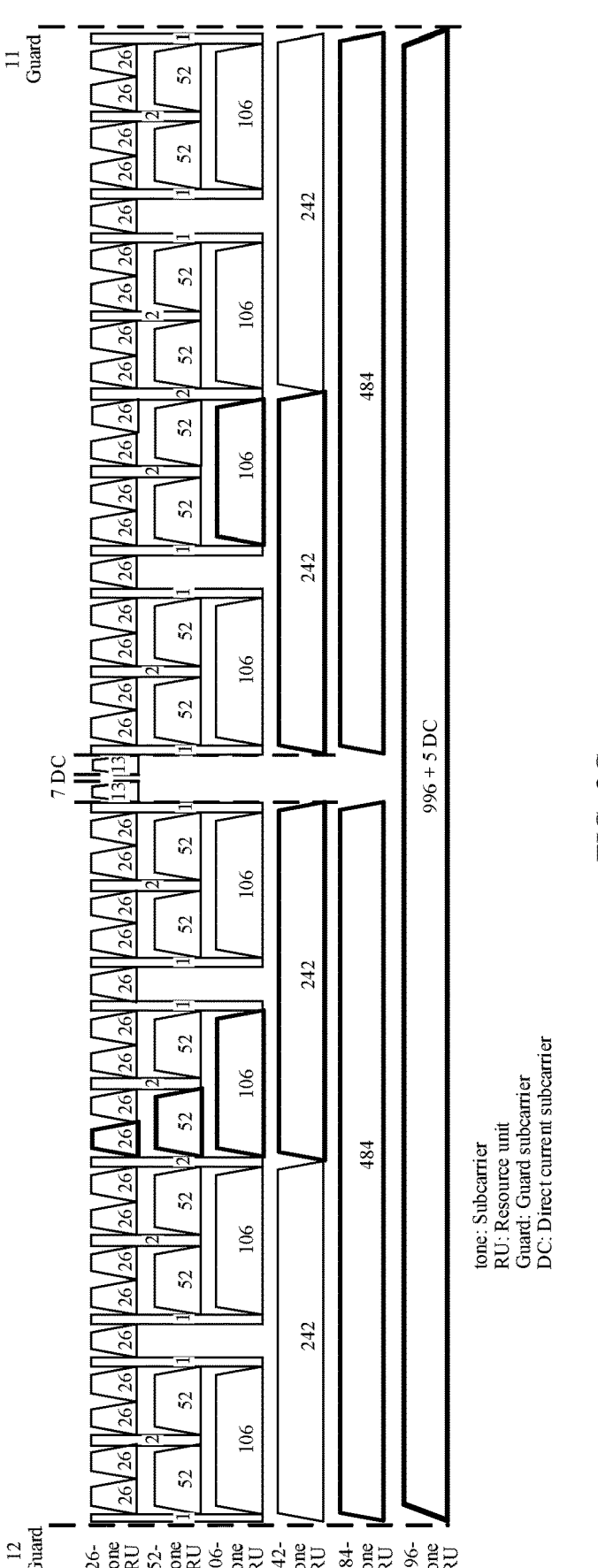
FIG. 2C is another schematic diagram of subcarrier distribution and RU distribution according to an embodiment of this application.

FIG. 2C is another schematic diagram of subcarrier distribution and RU distribution according to an embodiment of this application. When a bandwidth is 80 MHz, the entire bandwidth includes four 242-tone RUs. Particularly, in the middle of the entire bandwidth, there is an intermediate 26-tone RU including two 13-tone subunits. The entire bandwidth may include an entire 996-tone RU, or may include various combinations such as a combination of 26-tone RUs, a combination of 52-tone RUs, a combination of 106-tone RUs, a combination of 242-tone RUs, or a combination of 484-tone RUs. Empty subcarriers include parts shown by using 1 tone or 2 tones in the example shown in FIG. 2C. Specifically, as shown in FIG. 2C, the $1^{st}$ row indicates that the 80-MHz bandwidth may include 37 26-tone RUs, the $2^{nd}$ row indicates that the 80-MHz bandwidth may include 16 52-tone RUs, the $3^{rd}$ row indicates that the 80-MHz bandwidth may include eight 106-tone RUs, the $4^{th}$ row indicates that the 80-MHz bandwidth may include four 242-tone RUs, the 5th row indicates that the 80-MHz bandwidth may include two 484-tone RUs, and the $6^{th}$ row indicates that the 80-MHz bandwidth may include one 996-tone RU.

According to the foregoing rule, when a bandwidth is 160 MHz or 80+80 MHz, the entire bandwidth may be considered as two replications of the 80-MHz subcarrier distribution. The entire bandwidth may include an entire 2*996-tone RU, or may include various combinations such as a combination of 26-tone RUs, a combination of 52-tone RUs, a combination of 106-tone RUs, a combination of 242-tone RUs, a combination of 484-tone RUs, or a combination of 996-tone RUs. A difference between 160 MHz and 80+80 MHz lies in that the former is a continuous frequency band, and the two 80-MHz frequency bands of the latter may be separated. Similarly, when a bandwidth is 240 MHz or 160+80 MHz, the entire bandwidth may be considered as three replications of the 80-MHz subcarrier distribution. When a bandwidth is 320 MHz or 160+160 MHz, the entire bandwidth may be considered as four replications of the 80-MHz subcarrier distribution. Details are not described one by one herein again.

2. Trigger Frame

In IEEE 802.11ax, a trigger-based and scheduling-based uplink transmission method is introduced. Using FIG. 1 as an example, the AP may send a trigger frame to the STA 1 and the STA 2, to trigger the STA 1 to perform data communication with the AP by using a resource unit allocated by the AP to the STA 1, and trigger the STA 2 to perform data communication with the AP by using a resource unit allocated by the AP to the STA 2. FIG. 3 is a schematic diagram of a data transmission process according to an embodiment of this application. First, an AP sends a trigger frame to a STA, where the trigger frame includes resource scheduling and another parameter that are used by one or more stations to send an uplink physical layer protocol data unit (PPDU). After receiving the trigger frame, the STA parses the trigger frame, and obtains a user information field that matches an association identifier (AID) of the STA. The STA determines, based on a resource unit allocation subfield in the user information field, an RU allocated to the STA, and sends a high efficiency trigger-based physical layer protocol data unit (HE TB PPDU) on the RU. Next, after receiving an uplink multi-user PPDU that includes the uplink sub-PPDU sent by the one or more stations (for example, the STA 1 and the STA 2), the AP replies a multi-user block acknowledgement frame (M-BA).

FIG. 4 is a schematic diagram of a frame formant of a trigger frame according to an embodiment of this application. The trigger frame may include only a part of fields shown in FIG. 4, or may include more fields than the fields shown in FIG. 4. This is not limited in this embodiment of this application. For example, the trigger frame includes a common information (common info) field and a user information list (user info list) field. The trigger frame may further include a frame control field, a duration field, a receiver address (RA) field, a transmitter address (TA) field, a padding field, a frame check sequence (FCS) field, and the like. The common information field includes common information that needs to be read by one or more STAs that receive the trigger frame. The user information list field includes one or more user information fields, and one STA needs to read a user information field that includes an AID of the STA. A resource element allocation (RU Allocation) subfield in the user information field may indicate a specific RU allocated to the STA (the STA corresponding to the AID).

Figure 5:
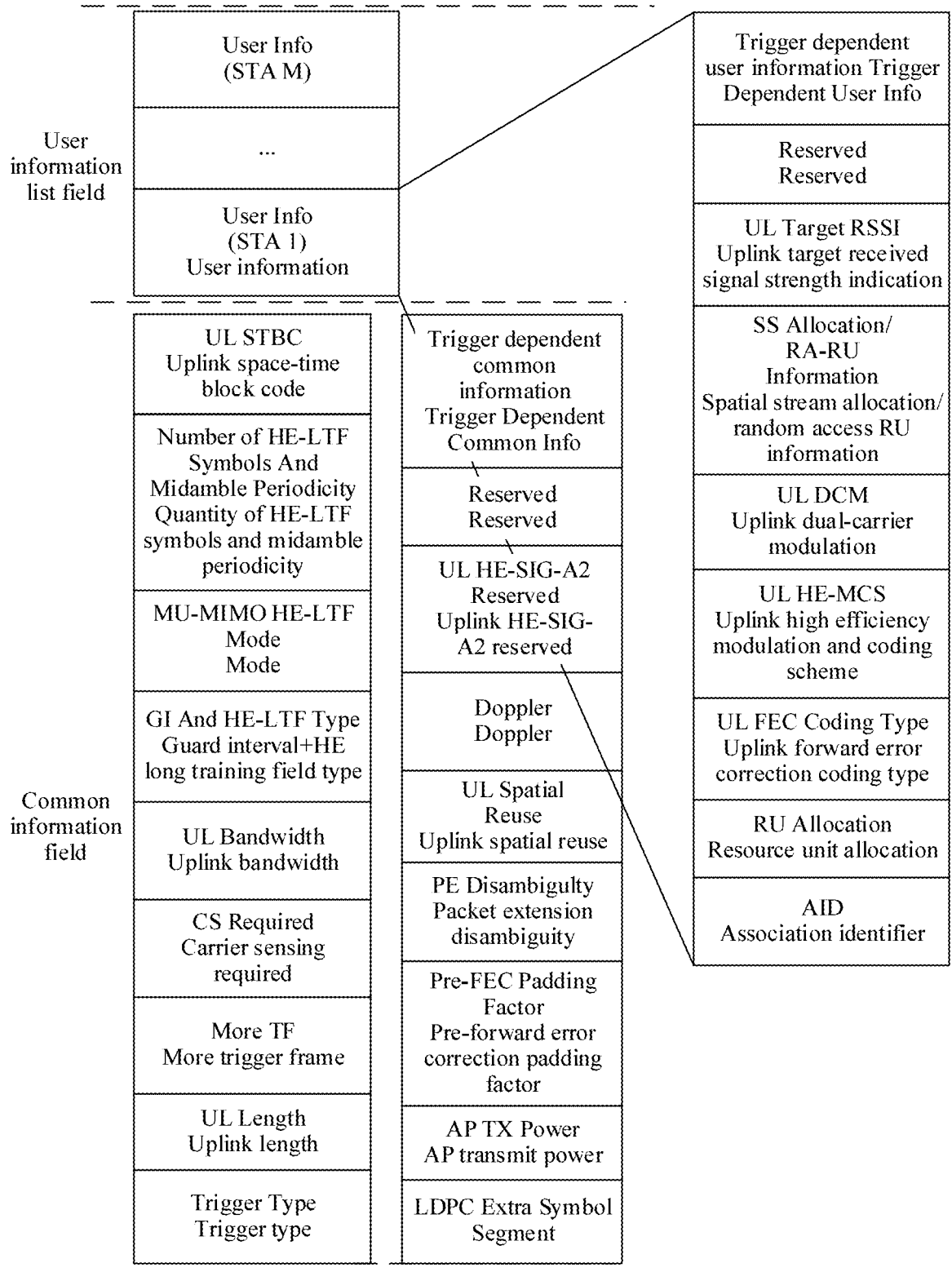
FIG. 5 is a schematic diagram of frame formats of a common information field and a user information list field in a trigger frame according to an embodiment of this application.

FIG. 5 is a schematic diagram of frame formats of a common information field and a user information list field in a trigger frame according to an embodiment of this application. It should be noted that an example herein is a frame structure of a trigger frame in the IEEE 802.11ax standard. A common information field may also be referred to as a common domain or a common information domain. The common information field includes common information that needs to be read by all stations, for example, a trigger type subfield, an uplink length (UL length) subfield, a more trigger frame (More TF) subfield, a multi-user multiple-input multiple-output high efficiency long training field mode (MU-MIMO HE-LTF Mode) subfield, a quantity of high efficiency long training field (HE-LTF) symbols and midamble periodicity (Number of HE-LTF Symbols And Midamble Periodicity) subfield, an uplink space-time block code (UL STBC) subfield, a low-density parity-check extra symbol segment (Low-density parity-check (LDPC) Extra Symbol Segment) subfield, an AP transmit power (AP TX Power) subfield, a pre-forward error correction padding factor (Pre-FEC Padding Factor) subfield, a packet extension disambiguity (PE Disambiguity) subfield, an uplink spatial reuse (UL Spatial Reuse) subfield, a Doppler subfield, a cascade indication (cascading connection) subfield, a carrier sensing required (CS Required) subfield, an uplink bandwidth (bandwidth) subfield, a guard interval+long training field (GI+LTF) subfield, and a trigger dependent common information (trigger dependent common info) subfield.

The user information list field may also be referred to as a user information list domain, a site-by-site domain, or the like. The user information list field includes one or more user information (user info) fields. One user information field includes information that needs to be read by a station, for example, an association identifier (AID) subfield, a resource unit allocation (RU allocation) subfield, an uplink forward error correction coding type (UL FEC Coding Type) subfield, an uplink high efficiency modulation and coding scheme (UL HE-MCS) subfield, an uplink dual-carrier modulation (UL DCM) subfield, a spatial stream allocation/random access RU information (SS Allocation/RA-RU Information) subfield, an uplink target received signal strength indication (UL Target RSSI) subfield, a reserved subfield, and a trigger dependent user information (trigger dependent user info) subfield.

The association identifier field is used to indicate an association identifier of a station corresponding to the user information field. The resource unit allocation subfield is used to indicate a resource unit (or a resource unit position) that is indicated by the user information field and that is allocated to the station. In this embodiment of this application, the user information field may indicate the resource unit by using the resource unit allocation subfield.

The "field" described in this specification may also be referred to as a "domain", "information", or the like, and the "subfield" may be referred to as a "sub-domain", "information", or the like.

Trigger-based and scheduling-based uplink transmission means that a station may send a packet, namely, a physical layer protocol data unit (PPDU), on an allocated resource unit. The packet may be a high efficiency trigger-based physical layer protocol data unit (HE TB PPDU). For a function of each field of the PPDU, refer to Table 1.

TABLE 1

| Chinese expression | Function |
| --- | --- |
| Legacy short training field (L-STF) | Used for PPDU discovery, coarse synchronization, and automatic gain control. |
| Legacy long training field (L-LTF) | Used for fine synchronization and channel estimation. |
| Legacy signal field (Legacy Signal Field A, L-SIG) | Used to carry signal information related to a PPDU length, to ensure coexistence. |
| High efficiency signal field A (HE-SIG A) | Used to carry a signal used to demodulate subsequent data. |
| High efficiency short training field (HE-STF) | Used for automatic gain control of a subsequent field. |
| High efficiency long training field (HE-LTF) | Used for channel estimation. |
| Data | Carry data information. |

Currently, in an HE TB PPDU transmission method in which carrier sensing needs to be performed, a trigger frame includes a carrier sensing required indication. In this transmission method, before transmitting an HE TB PPDU, a STA performs carrier sensing on one or more 20-MHz sub-channels on which an RU allocated to the STA is located. Specifically, the STA detects whether sensed energy exceeds a preset threshold. If the sensed energy exceeds the preset threshold, the STA determines that a 20-MHz sub-channel is busy; otherwise, the STA determines that the 20-MHz sub-channel is idle. In 802.11ax, it is specified that if a 20-MHz sub-channel in a range in which the allocated RU is located is busy, the HE TB PPDU cannot be transmitted, to prevent interference to other transmission.

Figure 6:
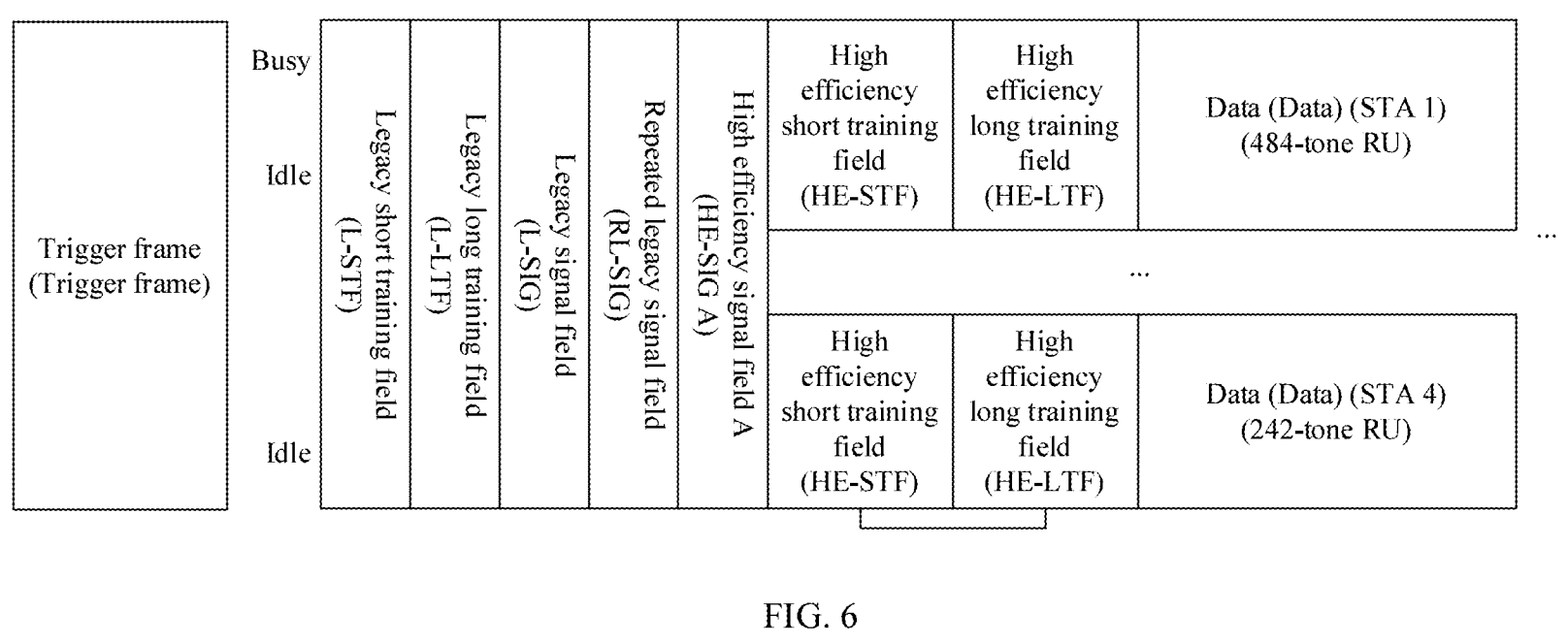

FIG. 6 is a schematic flowchart of trigger-based and scheduling-based uplink transmission according to an embodiment of this application. As shown in FIG. 6, after receiving a trigger frame, a station may determine a plurality of resource units allocated to the station. For example, for the STA 1, an RU allocated to the STA 1 is a 484-tone RU, a frequency range corresponding to the 484-tone RU is 40 MHz, and the frequency range includes two 20-MHz sub-channels. For the STA 4, a 242-tone RU is allocated to the STA 4, a frequency range corresponding to the 242-tone RU is 20 MHz, and the frequency range includes one 20-MHz sub-channel. The STA 1 performs carrier sensing before transmission. If the STA 1 detects that a sub-channel 1 is busy and a sub-channel 2 is idle, transmission cannot be performed. The STA 4 performs carrier sensing before transmission. If the STA 4 detects that the sub-channel is idle, transmission can be performed.

With the development of wireless communication technologies, in the IEEE 802.11be protocol standard, a plurality of RUs are allowed to be allocated to a same user. To further improve a spectrum utilization rate, when the plurality of RUs are allocated to the same user, before transmitting an extremely high throughput trigger-based physical layer protocol data unit (Extremely High Throughput Trigger Based Physical layer Protocol Data Unit, EHT TB PPDU), a station may select, for transmission, an idle RU in the plurality of RUs allocated to the station. The embodiments of this application provide a multi-resource-unit transmission indication method, and a related device, to indicate the RU used by the station to actually transmit the EHT TB PPDU.

The following further describes the multi-resource-unit transmission indication method provided in the embodiments of this application with reference to the data communication system, the STA, and the AP that are described in the foregoing content.

Figure 7:
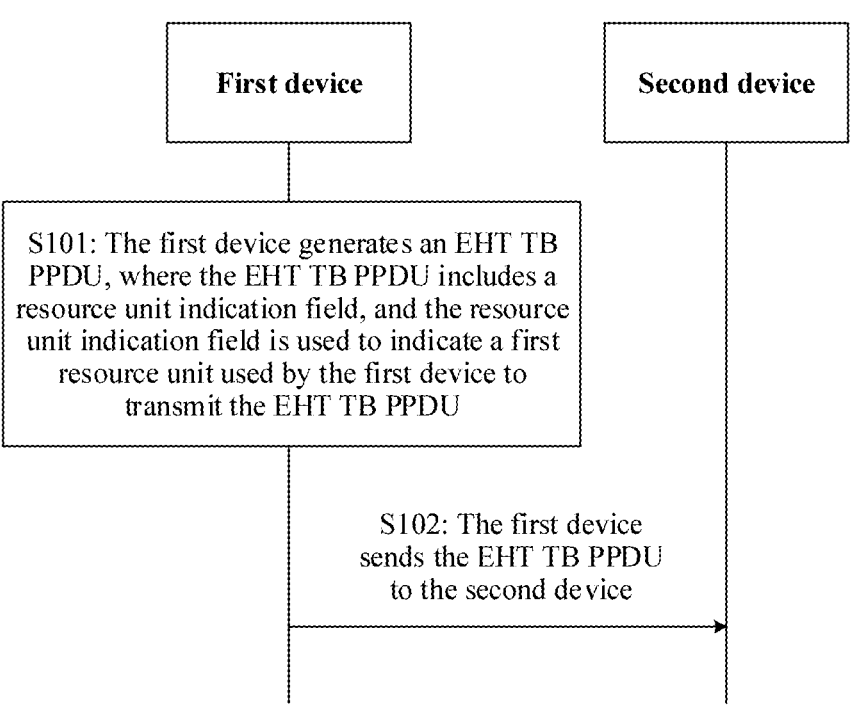
FIG. 7 is a flowchart of a multi-resource-unit transmission indication method according to an embodiment of this application.

FIG. 7 is a flowchart of a multi-resource-unit transmission indication method according to an embodiment of this application. The method may be implemented based on the data communication system shown in FIG. 1. A first device described below may be the STA 1 or the STA 2 in the data communication system shown in FIG. 1, and a second device described below may be the AP in the data communication system shown in FIG. 1. In another embodiment, a first device described below may be the AP in the data communication system shown in FIG. 1, and a second device described below may be another AP capable of performing data communication with the AP shown in FIG. 1. In another embodiment, a first device described below may be the STA 1 in the data communication system shown in FIG. 1, and a second device described below may be the STA 2 in the data communication system shown in FIG. 1. In another embodiment, a first device described below may be the AP in the data communication system shown in FIG. 1, and a second device described below may be the STA 1 or the STA 2 in the data communication system shown in FIG. 1. In another possible implementation, a first device or a second device may alternatively be a multi-link device (MLD). The method includes but is not limited to the following steps.

S101: The first device generates an extremely high throughput trigger-based physical layer protocol data unit (EHT TB PPDU).

The EHT TB PPDU includes a resource unit indication field, the resource unit indication field is used to indicate a first resource unit used by the first device to transmit the EHT TB PPDU, the first resource unit is included in a second resource unit, and the second resource unit is one or more resource units allocated to the first device. It should be noted that, in this embodiment of this application, only EHT is used as an example. During actual application, the EHT may alternatively be another name, for example, may be a name used in a standard after the IEEE 802.11ax standard.

In some embodiments, the second resource unit may be indicated by a trigger frame received by the first device. Optionally, before the first device generates the EHT TB PPDU, the method further includes: The first device receives the trigger frame sent by the second device, where the trigger frame includes a common information field and a user information field that is the same as an association identifier (AID) of the first device, the user information field is used to indicate the second resource unit, the common information field includes an indication field, and the indication field is used to indicate that the first device is allowed to transmit the EHT TB PPDU in a part of resource units of the second resource unit.

FIG. 8A is a schematic diagram of a frame format of a common information field in a trigger frame according to an embodiment of this application. For a position of an indication field in the trigger frame, refer to FIG. 8A. It should be noted that the position of the indication field may alternatively be another position in the trigger frame, and FIG. 8A is only an example. In a possible implementation, if a value of the indication field is 1, it indicates that the first device is allowed to transmit the EHT TB PPDU in the part of the second resource unit; or if the value of the indication field is 0 it indicates that the first device is not allowed to transmit the EHT TB PPDU in the part of the second resource unit. In another possible implementation, the value of the indication field may alternatively be another value, for example, 11 (indicating that the first device is allowed to transmit the EHT TB PPDU in the part of the second resource unit), or 00 (indicating that the first device is not allowed to transmit the EHT TB PPDU in the part of the second resource unit). In another possible implementation, the indication field may alternatively be a preset sequence. When the trigger frame includes the indication field, it indicates that the first device is allowed to transmit the EHT TB PPDU in the part of the second resource unit. When the trigger frame does not include the indication field, it indicates that the first device is not allowed to transmit the EHT TB PPDU in the part of the second resource unit. There may alternatively be another design manner for the indication field. Details are not described one by one herein.

In addition, for the user information field in the trigger frame, refer to the descriptions in the embodiment corresponding to FIG. 5. The first device may determine, based on the user information field including the AID of the first device, the second resource unit allocated to the first device. It should be noted that content of the trigger frame sent to the EHT STA may be different from that of a trigger frame in the 802.11ax standard. The trigger frame sent to the EHT STA may be a redesigned EHT trigger frame, or may be an EHT trigger frame that is obtained by escaping a part of fields when an HE trigger frame is multiplexed.

Figure 8B:
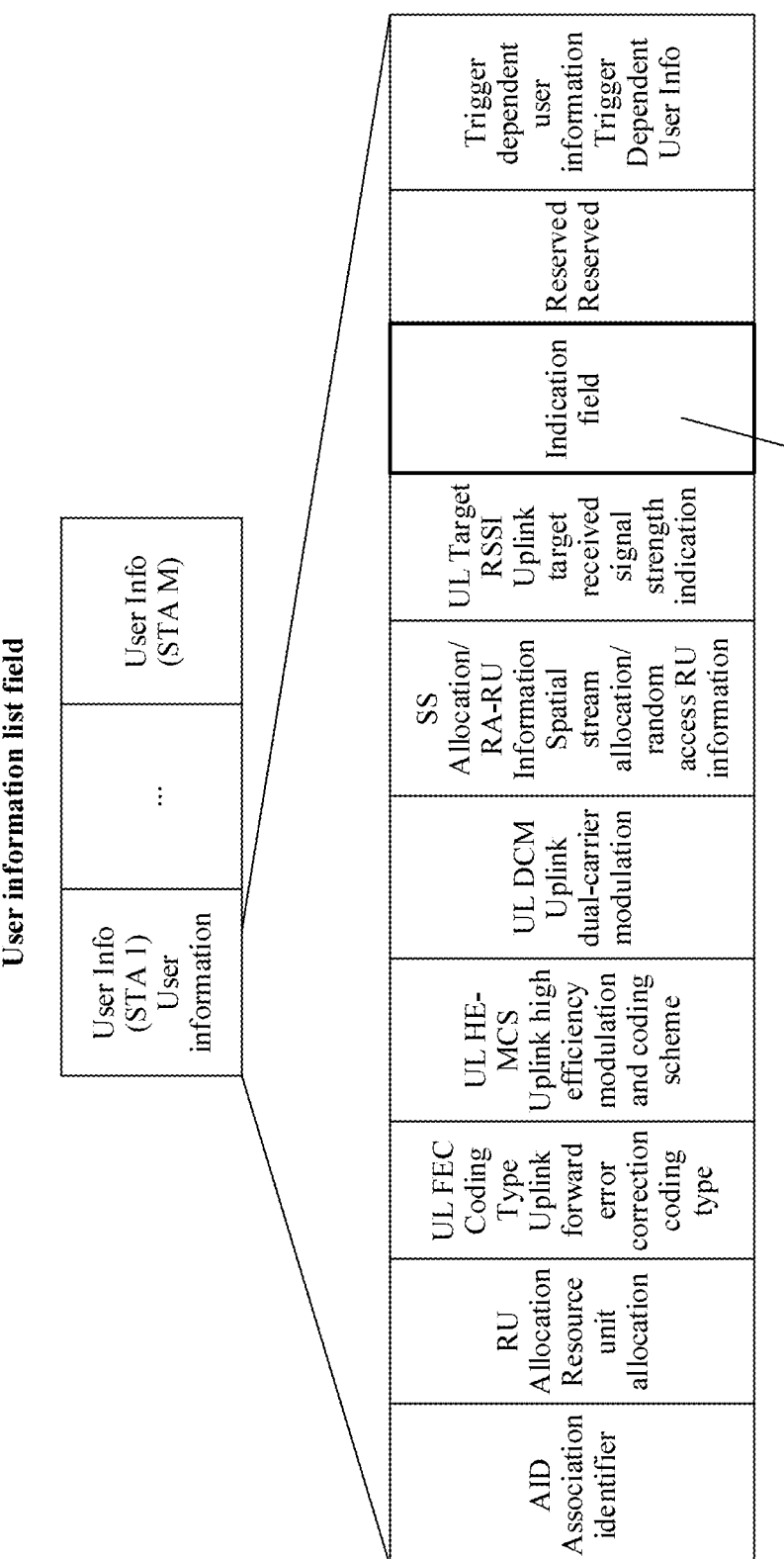
FIG. 8B is a schematic diagram of a frame format of a user information list field in a trigger frame according to an embodiment of this application.

In some other embodiments, the indication field may alternatively be located in the user information field. FIG. 8B is a schematic diagram of a frame format of a user information list field in a trigger frame according to an embodiment of this application. For a position of an indication field in the trigger frame, refer to FIG. 8B. In a possible implementation, if a value of the indication field is 1, it indicates that the first device is allowed to transmit the EHT TB PPDU in the part of the second resource unit; or if the value of the indication field is 0 it indicates that the first device is not allowed to transmit the EHT TB PPDU in the part of the second resource unit. In another possible implementation, the value of the indication field may alternatively be another value, for example, 11 (indicating that the first device is allowed to transmit the EHT TB PPDU in the part of the second resource unit), or 00 (indicating that the first device is not allowed to transmit the EHT TB PPDU in the part of the second resource unit). In another possible implementation, the indication field may alternatively be a preset sequence. When the user information field includes the indication field, it indicates that the first device is allowed to transmit the EHT TB PPDU in the part of the second resource unit. When the user information field does not include the indication field, it indicates that the first device is not allowed to transmit the EHT TB PPDU in the part of the second resource unit. In this manner, when the first device is a station and the second device is an access point, the access point may indicate, by using the trigger frame, that a part of stations are allowed to select a part of resource units in resource units allocated to the stations, to transmit the EHT TB PPDU, and that the other part of stations are not allowed to select a part of resource units in the resource units allocated to the stations, to transmit the EHT TB PPDU.

S102: The first device sends the EHT TB PPDU to the second device.

Correspondingly, the second device receives the EHT TB PPDU. The second device may determine, by reading the resource unit indication field in the EHT TB PPDU, the RU used by the first device to actually transmit the EHT TB PPDU.

Next, the EHT TB PPDU is further described. It should be noted that, for ease of description, an example in which the first device is a station and the second device is an access point is used for description below.

FIG. 9 is a schematic diagram of a frame format of an EHT TB PPDU according to an embodiment of this application. The EHT TB PPDU includes a legacy short training field (L-STF), a legacy long training field (L-LTF), a legacy signal field (Legacy Signal Field A, L-SIG), a universal signal (Universal SIG, U-SIG) field, an extremely high throughput short training field (EHT-STF), an extremely high throughput long training field (EHT-LTF), an extremely high throughput signal field (EHT-SIG), a data field, a packet extension (PE) field, and the like. For descriptions of each field in the EHT TB PPDU, refer to Table 2.

TABLE 2

| English abbreviation | Full English description | Chinese expression | Function |
|---|---|---|---|
| L-STF | Legacy Short Training Field | Legacy short training field | Used for PPDU discovery, coarse synchronization, and automatic gain control. |
| L-LTF | Legacy Long Training Field | Legacy long training field | Used for fine synchronization and channel estimation. |
| L-SIG | Legacy Signal Field A | Legacy signal field | Used to carry signal information related to a PPDU length, to ensure coexistence. |
| U-SIG | Universal SIG | Universal signal field | The universal signal field is similar to an HE-SIG-A, and a difference is that a unified signal field is used in an EHT PPDU and subsequent standards. Therefore, this field is referred to as the universal signal field. |

TABLE 2-continued

| English abbreviation | Full English description | Chinese expression | Function |
|---|---|---|---|
| EHT-STF | Extremely High Throughput Short Training Field | Extremely high throughput short training field | Used for automatic gain control of a subsequent field. |
| EHT-LTF | Extremely High Throughput Long Training Field | Extremely high throughput long training field | Used for channel estimation. |
| EHT-SIG | Extremely High Throughput Signal Field | Extremely high throughput signal field | Used to indicate an RU actually transmitted by a STA. |
| Data | — | Data | Carry data information. |
| PE | Packet Extension | Packet extension | Used to increase processing duration of a receiver. |

In a possible implementation, the EHT TB PPDU includes the high efficiency signal (EHT-SIG) field, the resource unit indication field is located in the EHT-SIG, and the EHT-SIG is located between the EHT-LTF and the data field (for a position of the resource unit indication field, refer to a position shown in FIG. 9). The EHT-SIG field may include the resource unit indication (RU allocation/bitmap) field, a modulation and coding scheme (MCS) field, a cyclic redundancy code (CRC) field, a frame trailer (Tail) field, and the like. It should be noted that FIG. 9 is merely an example. The EHT-SIG field may include only a part of fields shown in FIG. 9, or may include more fields than the fields shown in FIG. 9. This is not limited in this embodiment of this application. The resource unit indication field shown in FIG. 9 is used to indicate the first resource unit used by the STA 1 to transmit the EHT TB PPDU, and the MCS field may be used to indicate a modulation and coding scheme used by the first resource unit.

An advantage of using this frame structure lies in that, if the EHT-SIG is transmitted after the EHT-STF, uplink multi-user multiple-input multiple-output (UL MU-MIMO) transmission can be supported. Because the EHT-LTF supports channel estimation of a plurality of spatial streams, the EHT-LTF also supports sending that is of the EHT-SIG and that is based on the plurality of spatial streams, and no mutual interference is caused. Therefore, EHT-SIGs sent by a plurality of MU-MIMO users are not mixed together.

In another possible implementation, the EHT TB PPDU includes the EHT-SIG, the resource unit indication field is located in the EHT-SIG, and the EHT-SIG is located between the U-SIG and the EHT-STF. FIG. 10 is another schematic diagram of a frame format of an EHT TB PPDU according to an embodiment of this application. For descriptions of fields in the EHT TB PPDU, refer to the descriptions in the foregoing content. Details are not described herein again. An advantage of using this frame structure lies in that, in this structure, a position of each field in the EHT TB PPDU is the same as that in an EHT PPDU of another type, for example, an extremely high throughput single user physical layer protocol data unit (EHT SU PPDU) or an extremely high throughput multi-user physical layer protocol data unit (EHT MU PPDU). In this manner, the PPDUs may use a similar receiving process, thereby simplifying a processing process and reducing complexity.

In another possible implementation, the EHT TB PPDU includes the universal signal field (U-SIG), and the resource unit indication (RU allocation/bitmap) field is located in the U-SIG in the EHT TB PPDU. FIG. 11 is another schematic diagram of a frame format of an EHT TB PPDU according to an embodiment of this application. A U-SIG field may include a resource unit indication (RU allocation/bitmap) field, a cyclic redundancy code (CRC) field, a frame trailer (Tail) field, and the like. FIG. 11 is merely an example. The U-SIG field may include only a part of fields shown in FIG. 11, or may include more fields than the fields shown in FIG. 11. This is not limited in this embodiment of this application. By using this frame structure, overheads of the EHT-SIG field can be reduced.

For descriptions of each field in the U-SIG field, refer to Table 3.

TABLE 3

| Bit | Field | Meaning |
|---|---|---|
| B0 to B2 (U-SIG-1) | Physical layer version indication | Indicates a version of a physical layer of the PPDU, where the EHT PPDU is indicated in the solution of the present invention. |
| B3 | UL/DL | Indicates an uplink or a downlink, where the uplink is indicated in the solution of the present invention. |
| B4 to B9 | BSS Color | BSS: Basic Service Set, basic service set Indicates an identifier of the basic service set. |
| B10 to B16 | TXOP | TXOP: Transmit Opportunity, used to indicate a transmit opportunity. |
| B17 to 22 | Bandwidth | Used to indicate a bandwidth of the PPDU. |
| B23 to B24 | PPDU format | Used to indicate a format of the PPDU, where the EHT TB PPDU is indicated in the solution of the present invention. |

TABLE 3-continued

| Bit | Field | Meaning |
|---|---|---|
| B25 | Reserved | — |
| B0 to B15 (U-SIG-2) | RU allocation/bitmap | Indicates 20-MHz sub-channels on which a STA transmits the EHT TB PPDU. For a specific length of the field, refer to the following descriptions. |
| B16 to B19 | CRC | CRC: cyclic redundancy code, cyclic redundancy code, used to check the U-SIG, where CRC in the U-SIG and/or the EHT-SIG may have more bits, to improve reliability. |
| B20 to B25 | Tail | Tail bit, used to end encoding. |

The following further describes a manner in which the resource unit indication field indicates the first resource unit. It should be noted that the EHT TB PPDUs in the plurality of frame formats described in the foregoing content may use a plurality of indication manners described below.

In a first indication manner, the station pre-stores an index table, and the index table is used to indicate a correspondence between a value of the resource unit indication field and the first resource unit. For example, for the index table, refer to Table 4.

TABLE 4

Figure 12:
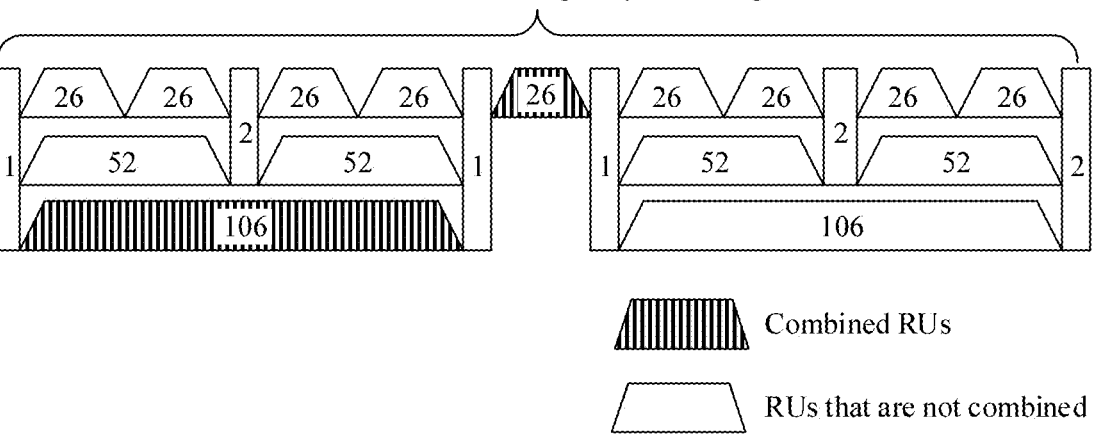
FIG. 12 and FIG. 13 are schematic diagrams of some combinations of a 106-tone RU and a 26-tone RU according to an embodiment of this application.
Figure 13:
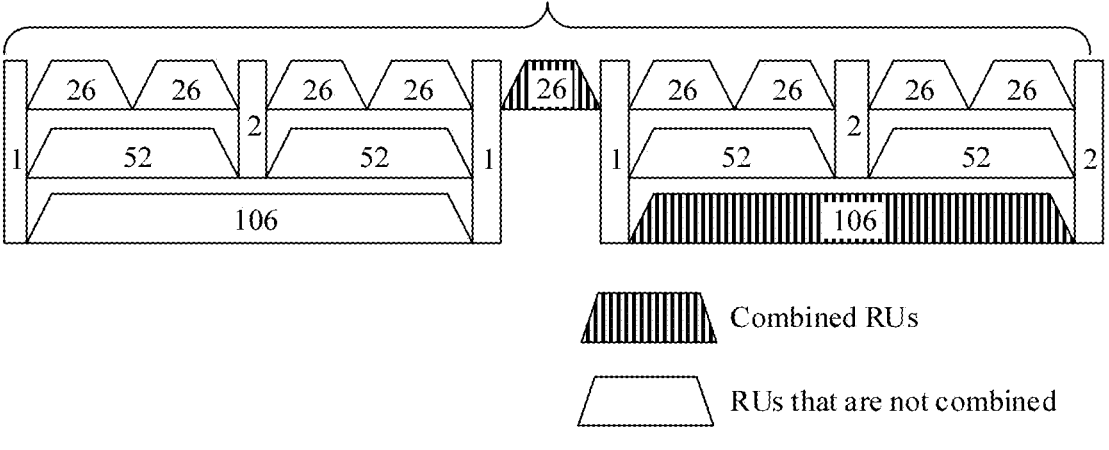
Figure 14:
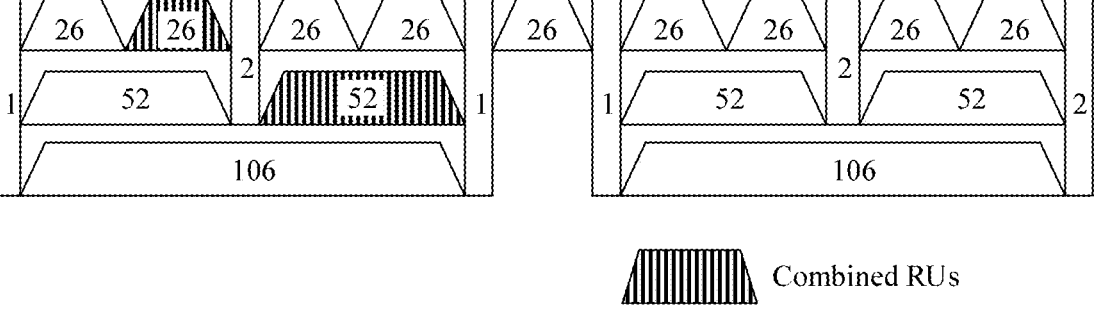
Figure 15:
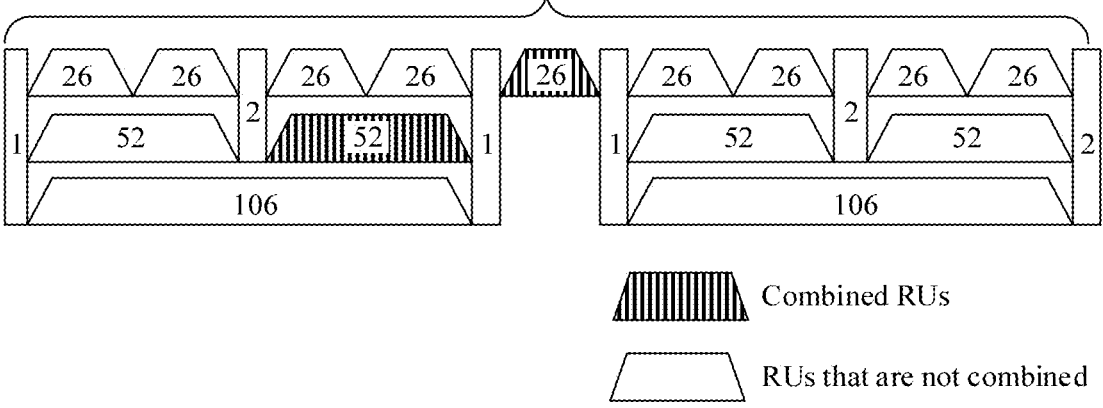
Figures 35, 36, 37:
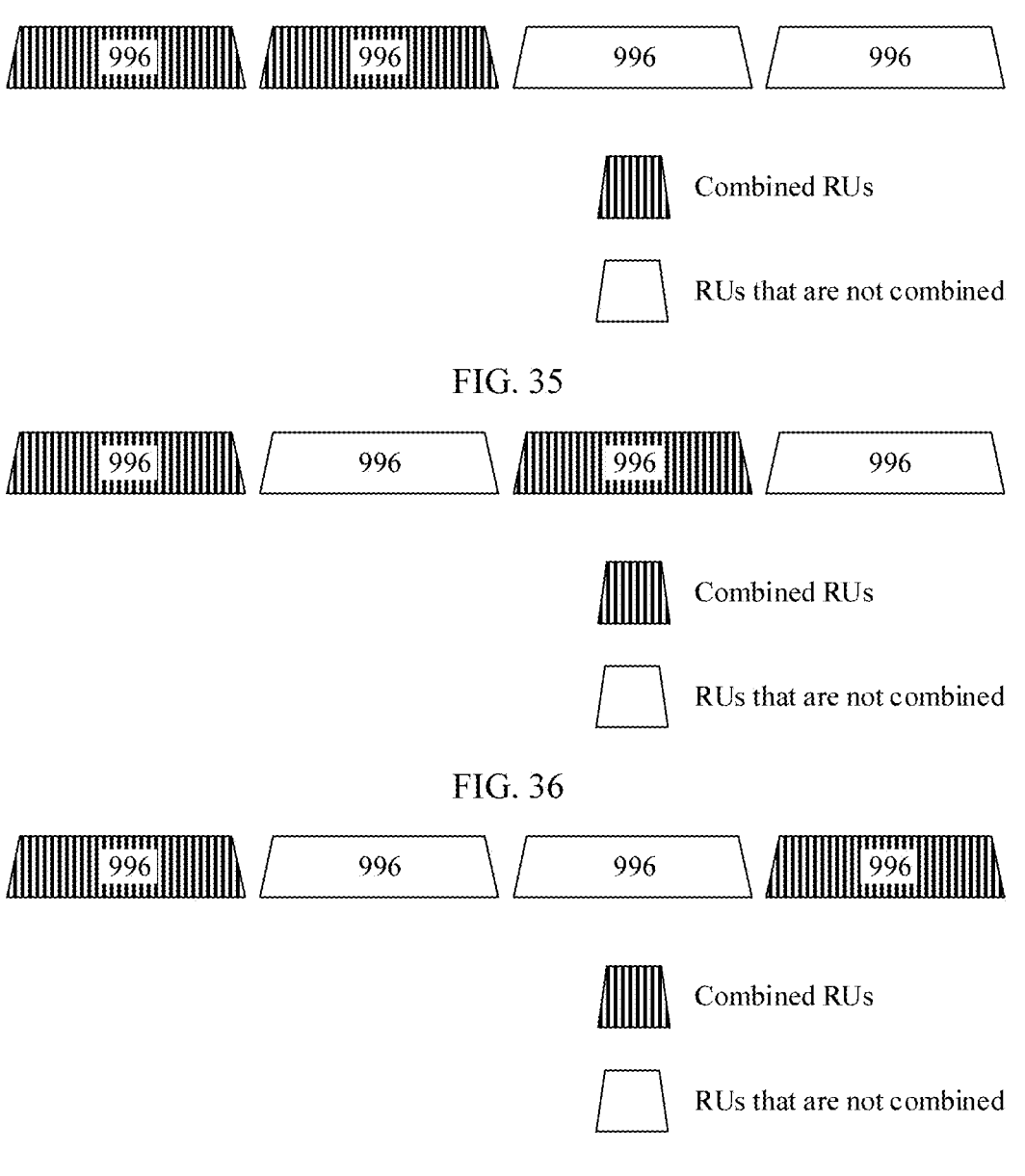
FIG. 35 to FIG. 37 are schematic diagrams of some combinations of two 996-tone RUs according to an embodiment of this application.

| Resource unit indication field (7 bits) | Indicated resource unit (or a plurality of combined resource units, a meaning, or descriptions) (description) | Quantity (number of entries) |
|---|---|---|
| 0 to 36 | The values may separately indicate 37 26-tone RUs in 80 MHz. (Possible 26-tone RU cases in 80 MHz) | 37 |
| 37 to 52 | The values may separately indicate 16 52-tone RUs in 80 MHz. (Possible 52-tone RU cases in 80 MHz) | 16 |
| 53 to 60 | The values may separately indicate eight 106-tone RUs in 80 MHz. (Possible 106-tone RU cases in 80 MHz) | 8 |
| 61 to 64 | The values may separately indicate four 242-tone RUs in 80 MHz. (Possible 242-tone RU cases in 80 MHz) | 4 |
| 65 and 66 | The values may separately indicate two 484-tone RUs in 80 MHz. (Possible 484-tone RU cases in 80 MHz) | 2 |
| 67 | The value indicates one 996-tone RU in 80 MHz. (996-tone RU cases in 80 MHz) | 1 |
| 68 to 70 | Two 996-tone RUs (as shown in FIG. 35, FIG. 36, and FIG. 37) | 3 |
| 71 | Four 996-tone RUs (as shown in FIG. 34) | 1 |
| 72 to 75 | A combination of a low-frequency 106-tone RU in a 20-MHz frequency band range in 80 MHz and a center 26-tone RU in the 20-MHz frequency band range (as shown in FIG. 12) | 4 (Each entry represents a 20-MHz frequency band range, so that four values are required for separate indication.) |
| 76 to 79 | A combination of a high-frequency 106-tone RU in a 20-MHz frequency band range in 80 MHz and a center 26-tone RU in the 20-MHz frequency band range (as shown in FIG. 13) | 4 (Each entry represents a 20-MHz frequency band range, so that four values are required for separate indication.) |
| 80 to 83 | A combination of a 52-tone RU having a second lowest frequency in a 20-MHz frequency band range in 80 MHz and a 26-tone RU that is on a same side with and adjacent to the 52-tone RU and that is in the 20-MHz frequency band range (as shown in FIG. 14) | 4 (Each entry represents a 20-MHz frequency band range, so that four values are required for separate indication.) |
| 84 to 87 | A combination of a 52-tone RU having a second lowest frequency in a 20-MHz frequency band range in 80 MHz and a center 26-tone RU in the 20-MHz frequency band range (as shown in FIG. 15) | 4 (Each entry represents a 20-MHz frequency band range, so that four values are required for separate indication.) |
| 88 to 91 | A combination of a 52-tone RU having a second highest frequency in a 20-MHz frequency band range in 80 MHz and a 26-tone RU that is on a same side and adjacent to with the 52-tone RU and that is in the 20-MHz frequency band range (as shown in FIG. 16) | 4 (Each entry represents a 20-MHz frequency band range, so that four values are required for separate indication.) |

TABLE 4-continued

Figures 19, 20, 21:
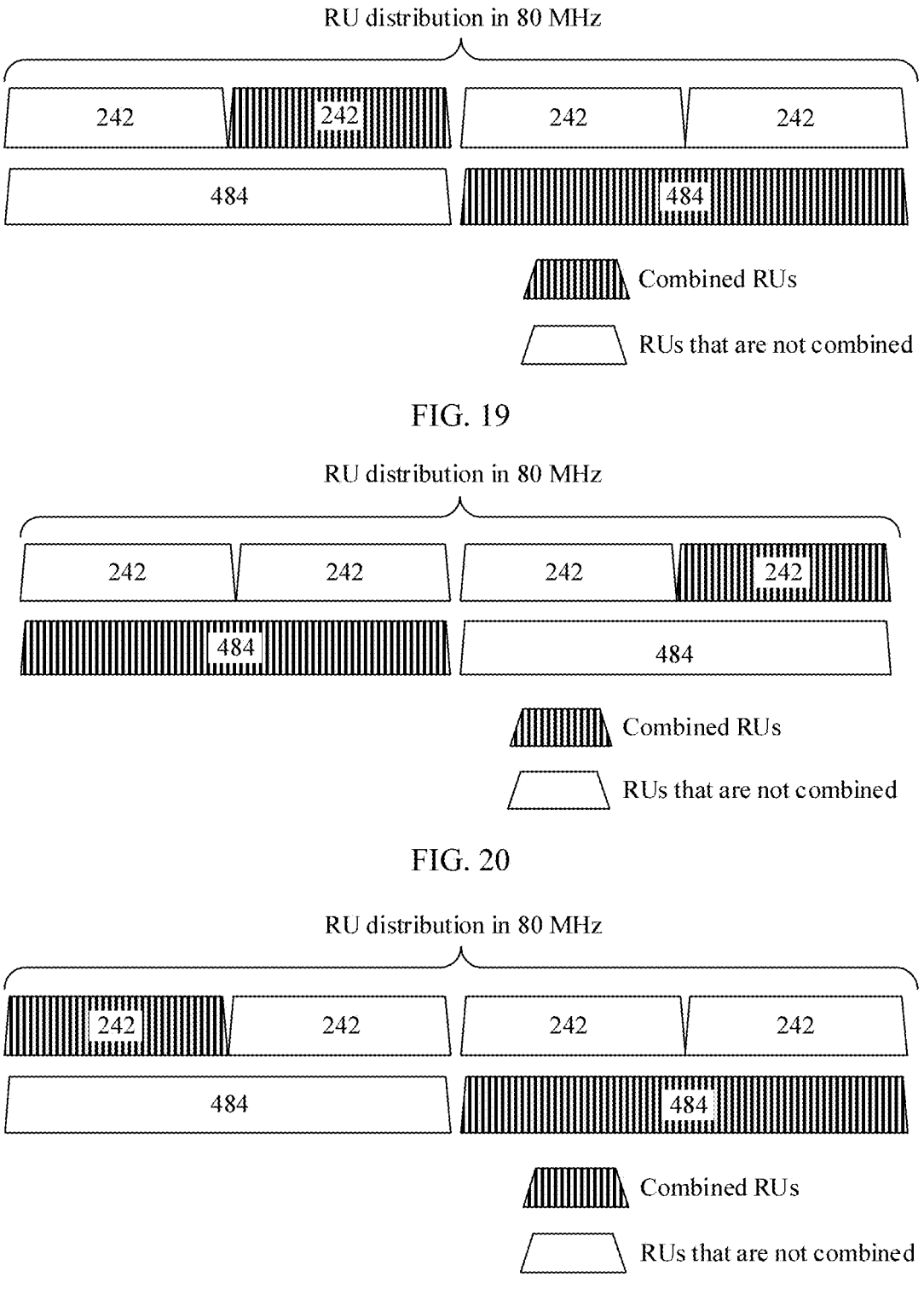
Figures 22, 23, 24:
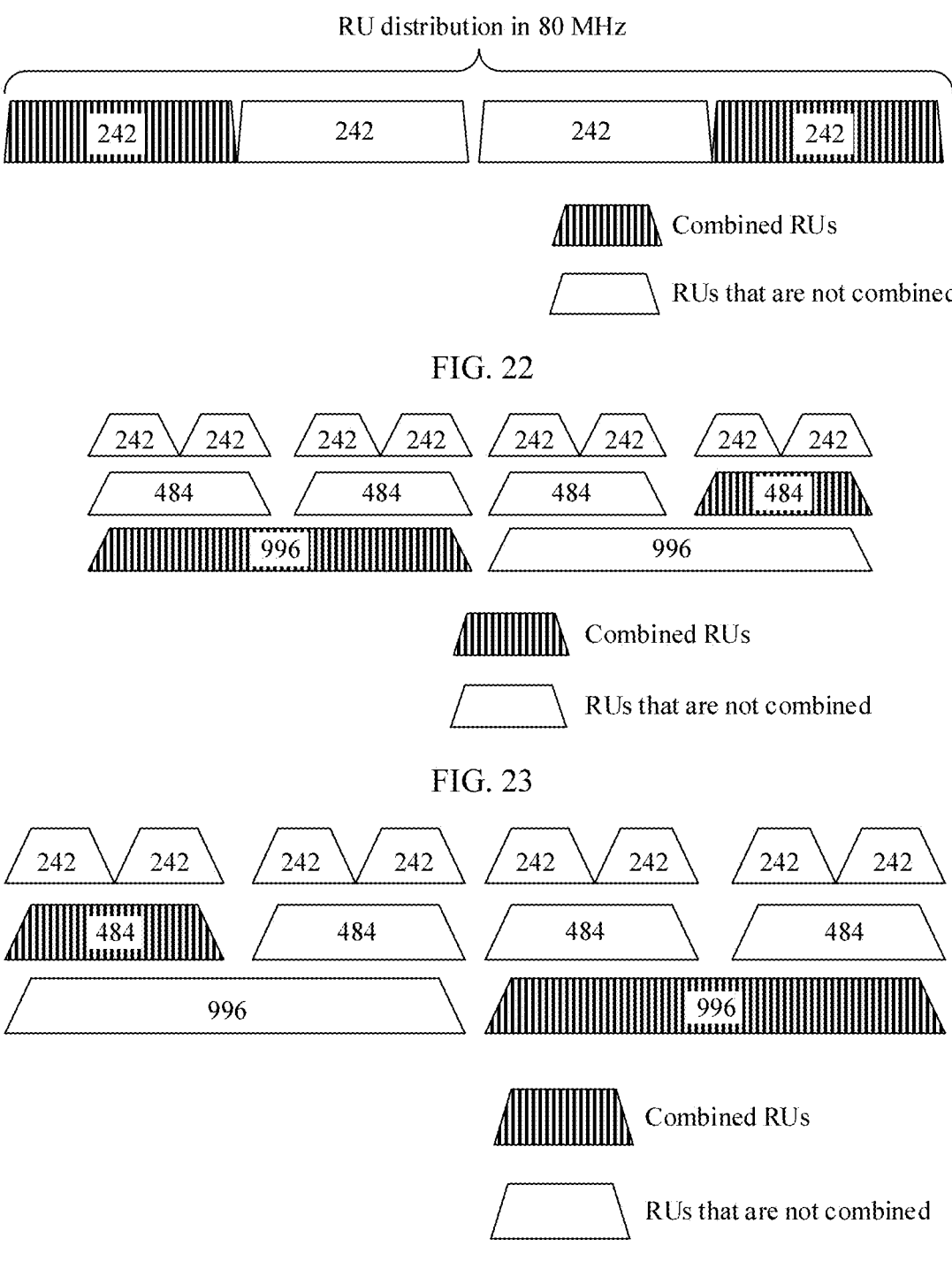
FIG. 22 is a schematic diagram of a combination of two 242-tone RUs according to an embodiment of this application.
FIG. 23 and FIG. 24 are schematic diagrams of some combinations of a 996-tone RU and a 484-tone RU according to an embodiment of this application.
Figures 25, 26, 27:
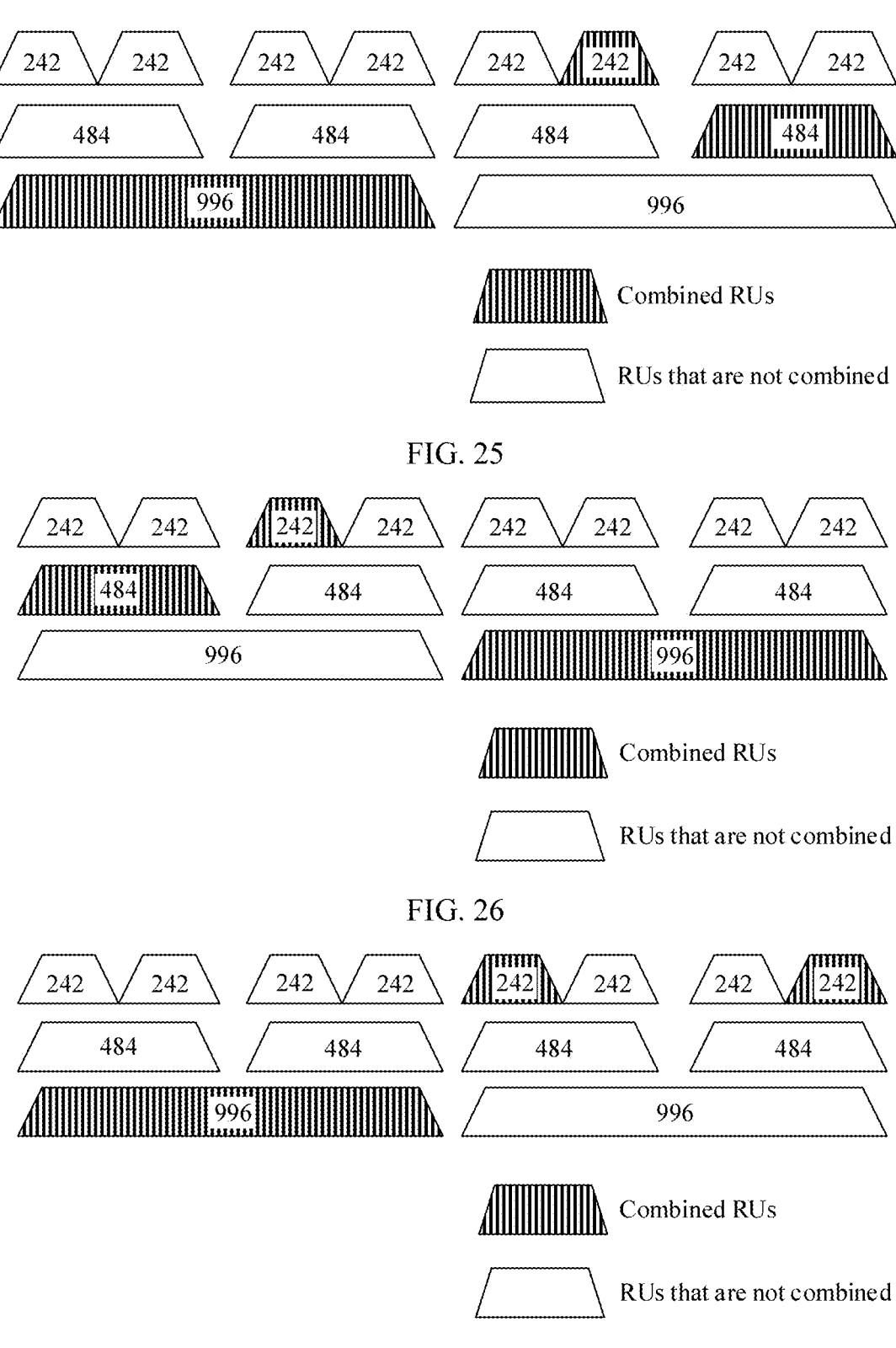
FIG. 25 and FIG. 26 are schematic diagrams of some combinations of a 996-tone RU, a 484-tone RU, and a 242-tone RU according to an embodiment of this application.
FIG. 27 and FIG. 28 are schematic diagrams of some combinations of a 996-tone RU and two 242-tone RUs according to an embodiment of this application.
Figures 28, 29, 30:
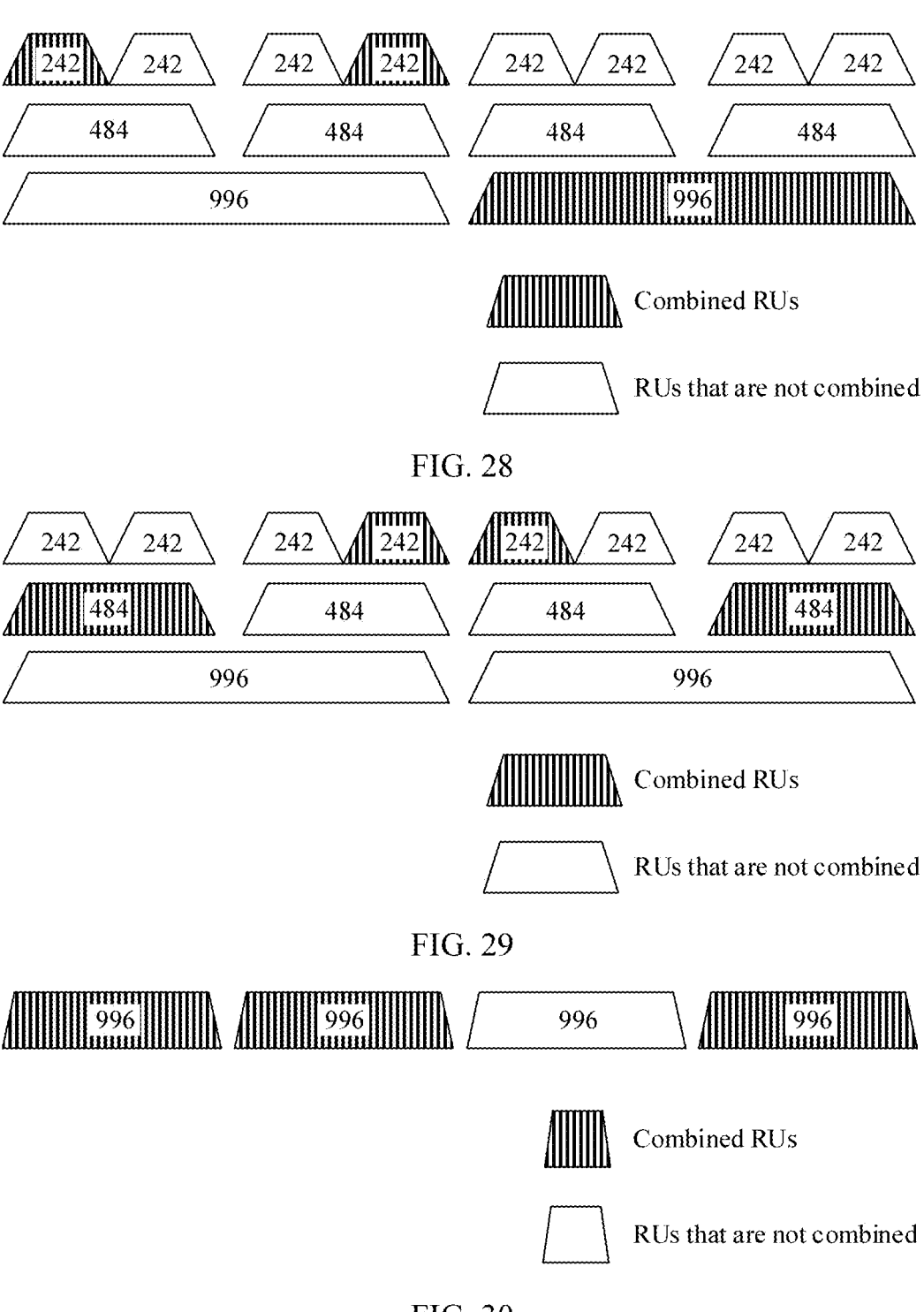
FIG. 29 is a schematic diagram of a combination of a 484-tone RU, a 242-tone RU, a 484-tone RU, and a 242-tone RU according to an embodiment of this application.
FIG. 30 to FIG. 33 are schematic diagrams of some combinations of three 996-tone RUs according to an embodiment of this application.
Figures 31, 32, 33, 34:
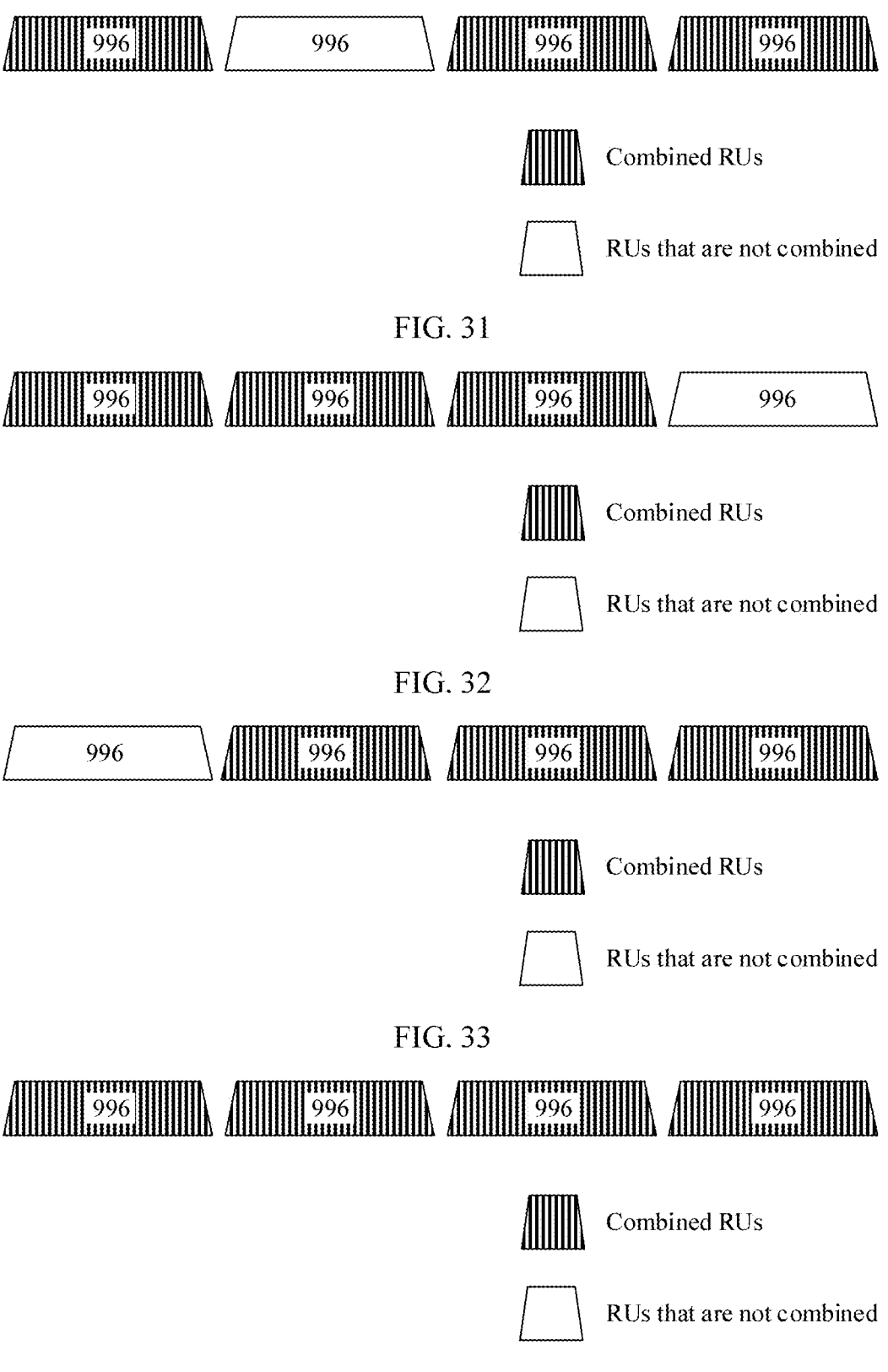
FIG. 34 is a schematic diagram of a combination of four 996-tone RUs according to an embodiment of this application.

| Resource unit indication field (7 bits) | Indicated resource unit (or a plurality of combined resource units, a meaning, or descriptions) (description) | Quantity (number of entries) |
| --- | --- | --- |
| 92 to 95 | A combination of a 52-tone RU having a second highest frequency in a 20-MHz frequency band range in 80 MHz and a center 26-tone RU in the 20-MHz frequency band range (as shown in FIG. 17) | 4 (Each entry represents a 20-MHz frequency band range.) |
| 96 and 97 | A combination of a 484-tone RU in 80 MHz and a 242-tone RU adjacent to the 484-tone RU (as shown in FIG. 18 and FIG. 19) | 2 (Two entries separately represent a low-frequency 484-tone RU and a high-frequency 484-tone RU.) |
| 98 and 99 | A combination of a 484-tone RU in 80 MHz and a 242-tone RU that is not adjacent to the 484-tone RU (as shown in FIG. 20 and FIG. 21) | 2 (Two entries separately represent a low-frequency 484-tone RU and a high-frequency 484-tone RU.) |
| 100 | A combination of two 242-tone RUs on two sides in 80 MHz (as shown in FIG. 22) | 1 |
| 101 and 102 | A combination of a currently indicated 996-tone RU and a 484-tone RU that is in adjacent 80 MHz and that is not adjacent to the 996-tone RU (as shown in FIG. 23 and FIG. 24) | 2 (Two entries separately represent that the 484-tone RU is located in lower-frequency adjacent 80 MHz and that the 484-tone RU is located in higher-frequency adjacent 80 MHz.) |
| 103 and 104 | A combination of a currently indicated 996-tone RU, and a 484-tone RU and a 242-tone RU that are in adjacent 80 MHz and that are not adjacent to the 996-tone RU (as shown in FIG. 25 and FIG. 26) | 2 (Two entries separately represent that the 484-tone RU and the 242-tone RU are located in lower-frequency adjacent 80 MHz and that the 484-tone RU and the 242-tone RU are located in higher-frequency adjacent 80 MHz.) |
| 105 and 106 | A combination of a currently indicated 996-tone RU and two 242-tone RUs in adjacent 80 MHz (as shown in FIG. 27 and FIG. 28) | 2 (Two entries separately represent that the two 242-tone RUs are located in lower-frequency adjacent 80 MHz and that the two 242-tone RUs are located in higher-frequency adjacent 80 MHz) |
| 107 | A combination of two 996-tone RUs having lowest frequencies and a 996-tone RU having a highest frequency in 320 MHz (as shown in FIG. 30) | 1 |
| 108 | A combination of a 996-tone RU having a lowest frequency and two 996-tone RUs having highest frequencies in 320 MHz (as shown in FIG. 31) | 1 |
| 109 | A combination of three 996-tone RUs having lowest frequencies in 320 MHz (as shown in FIG. 32) | 1 |
| 110 | A combination of three 996-tone RUs having highest frequencies in 320 MHz (as shown in FIG. 33) | 1 |
| 111 to 126 | A combination of a 484-tone RU and a 242-tone RU in currently indicated 80 MHz, and a 484-tone RU and a 242-tone RU in adjacent 80 MHz (as shown in FIG. 29) | 16 |
| 127 | Reserved | 1 |

In this manner, a frequency position of the first resource unit may be indicated by using the value of the resource unit indication field. It should be noted that the correspondences between the values in Table 4 and the indicated resource units may be adjusted. This is not limited in this embodiment of this application. For example, the values of the resource unit indication field may indicate, in descending order, the resource units whose frequencies are arranged in descending order, or the like. In this implementation, the resource unit indication field may indicate a plurality of resource units, and notify, in a manner of predefining in a protocol or a manner of signal configuration, the access point of the correspondences between the indexes and the various possible combinations of the plurality of resource units. In addition, the first resource unit indicated by using Table 4 is a part of all of resource units of the second resource unit that is indicated by the trigger frame and that is allocated to the station. Alternatively, the second resource unit may be notified to the station in another manner.

Optionally, the AP may pre-store the index table. The STA may indicate one of the indexes by using the resource unit indication field, so that the AP may determine, based on the index indicated by the resource unit indication field, one or more resource units used by the STA to transmit the EHT TB PPDU.

In a first possible implementation, the first resource unit indicated by the resource unit indication field is any one of the following resource units: any 26-subcarrier tone resource unit in an 80-MHz frequency band range (corresponding to a case in which the value of the field is 0 to 36); any 52-tone resource unit in an 80-MHz frequency band range (corresponding to a case in which the value of the field is 37 to 52); any 106-tone resource unit in an 80-MHz frequency band range (corresponding to a case in which the value of the field is 53 to 60); any 242-tone resource unit in an 80-MHz frequency band range (corresponding to a case in which the value of the field is 61 to 64); any 484-tone resource unit in an 80-MHz frequency band range (corresponding to a case in which the value of the field is 65 and 66); and any 996-tone resource unit corresponding to an 80-MHz frequency band range (corresponding to a case in which the value of the field is 67).

For a distribution manner of the first resource unit, refer to FIG. 2C. For example, 0 to 36 may be separately used to indicate 37 26-tone RUs that are at different positions in 80 MHz and that are represented in the $1^{st}$ row: 37 to 52 may be separately used to indicate 16 52-tone RUs that are at different positions in 80 MHz and that are represented in the $2^{nd}$ row: 53 to 60 may be separately used to indicate eight 106-tone RUs that are at different positions in 80 MHz and that are represented in the $3^{rd}$ row: 61 to 64 may be separately used to indicate four 242-tone RUs that are at different positions in 80 MHz and that are represented in the $4^{th}$ row: 65 and 66 may be separately used to indicate two 484-tone RUs that are at different positions in 80 MHz and that are represented in the $5^{th}$ row; and 67 may be used to indicate one 996-tone RU that may be included in 80 MHz and that is represented in the $6^{th}$ row.

In a second possible implementation, the first resource unit indicated by the resource unit indication field is a plurality of resource units corresponding to any one of the following combinations: a combination of a 106-tone resource unit having a lowest frequency in a 20-MHz frequency band range in an 80-MHz frequency band range and a center 26-tone resource unit in the 20-MHz frequency band range (corresponding to a case in which the value of the field is 72 to 75); a combination of a 106-tone resource unit having a highest frequency in a 20-MHz frequency band range in an 80-MHz frequency band range and a center 26-tone resource unit in the 20-MHz frequency band range (corresponding to a case in which the value of the field is 76 to 79); a combination of a 52-tone resource unit having a second lowest frequency in a 20-MHz frequency band range in an 80-MHz frequency band range and a 26-tone resource unit that is on a same side with and adjacent to the 52-tone resource unit and that is in the 20-MHz frequency band range (corresponding to a case in which the value of the field is 80 to 83); a combination of a 52-tone resource unit having a second lowest frequency in a 20-MHz frequency band range in an 80-MHz frequency band range and a center 26-tone resource unit in the 20-MHz frequency band range (corresponding to a case in which the value of the field is 84 to 87); a combination of a 52-tone resource unit having a second highest frequency in a 20-MHz frequency band range in an 80-MHz frequency band range and a 26-tone resource unit that is on a same side with and adjacent to the 52-tone resource unit and that is in the 20-MHz frequency band range (corresponding to a case in which the value of the field is 88 to 91); a combination of a 52-tone resource unit having a second highest frequency in a 20-MHz frequency band range in an 80-MHz frequency band range and a center 26-tone resource unit in the 20-MHz frequency band range (corresponding to a case in which the value of the field is 92 to 95); a combination of a 484-tone resource unit in an 80-MHz frequency band range and a 242-tone resource unit adjacent to the 484-tone resource unit (corresponding to a case in which the value of the field is 96 and 97); a combination of a 484-tone resource unit in an 80-MHz frequency band range and a 242-tone resource unit that is not adjacent to the 484-tone resource unit (corresponding to a case in which the value of the field is 98 and 99); a combination of two 242-tone resource units on two sides in an 80-MHz frequency band range (corresponding to a case in which the value of the field is 100); a combination of a 996-tone resource unit corresponding to an 80-MHz frequency band range and a 484-tone resource unit that is in an 80-MHz frequency band range adjacent to the 996-tone resource unit and that is not adjacent to the 996-tone resource unit (corresponding to a case in which the value of the field is 101 and 102); a combination of a 996-tone resource unit corresponding to an 80-MHz frequency band range, and a 484-tone resource unit and a 242-tone resource unit that are in an 80-MHz frequency band range adjacent to the 996-tone resource unit and that are not adjacent to the 996-tone resource unit (corresponding to a case in which the value of the field is 103 and 104); a combination of a 996-tone resource unit corresponding to an 80-MHz frequency band range, and two 242-tone resource units in an 80-MHz frequency band range adjacent to the 996-tone resource unit (corresponding to a case in which the value of the field is 105 and 106); and a combination of a 484-tone resource unit and a 242-tone resource unit in an 80-MHz frequency band range, and a 484-tone resource unit and a 242-tone resource unit in an 80-MHz frequency band range adjacent to the 80-MHz frequency band range (corresponding to a case in which the value of the field is 111 to 126).

For a distribution manner of the first resource unit, refer to FIG. 12 to FIG. 29. Each case is described in more detail below. It should be noted that "a solution of combining a 52-tone resource unit having a second lowest frequency in a 20-MHz frequency band range in an 80-MHz frequency band range and a 26-tone resource unit that is on a same side with and adjacent to the 52-tone resource unit and that is in the 20-MHz frequency band range" is used as an example. "The 26-tone resource unit is on the same side with and adjacent to the 52-tone resource unit" is related to a position of the 20-MHz frequency band range in the 80-MHz frequency band range. If the 20-MHz frequency band range is on the left of a center position of the 80-MHz frequency band range, "the 26-tone resource unit is on the same side with and adjacent to the 52-tone resource unit" means that "the 26-tone resource unit is on the left side of and adjacent to the 52-tone resource unit"; or if the 20-MHz frequency band range is on the right of a center position of the 80-MHz frequency band range, "the 26-tone resource unit is on the same side with and adjacent to the 52-tone resource unit" means that "the 26-tone resource unit is on the right side of and adjacent to the 52-tone resource unit".

In addition, in this specification, an RU having a second lowest frequency, an RU having a lowest frequency, an RU having a second highest frequency, and an RU having a highest frequency are all relative to a frequency range. For example, as shown in FIG. 2C, in the $1^{st}$ 20 MHz, a 52-tone RU having a second lowest frequency is the 2$^{nd}$ 52-tone RU in the 2$^{nd}$ row in FIG. 2C, a 52-tone RU having a lowest frequency is the 1$^{st}$ 52-tone RU in the 2$^{nd}$ row in FIG. 2C, a 52-tone RU having a second highest frequency is the 3$^{rd}$ 52-tone RU in the 2$^{nd}$ row in FIG. 2C, and a 52-tone RU with a highest frequency is the 4$^{th}$ 52-tone RU in the 2$^{nd}$ row in FIG. 2C. Correspondingly, for another RU, an RU having a second lowest frequency, an RU having a lowest frequency, an RU having a second highest frequency, and an RU having a highest frequency are similar, and details are not described herein again. In addition, in this specification, a low-frequency RU and a high-frequency RU are also relative to a frequency range. Generally, there are two RUs in the frequency range. The low-frequency RU is an RU that is at a lower frequency in the two RUs, and the high-frequency RU is an RU that is at a higher frequency in the two RUs. For example, as shown in FIG. 2C, in the 1$^{st}$ 20 MHz, a low-frequency 106-tone RU is the 1$^{st}$ 106-tone RU in the 3$^{rd}$ row in FIG. 2C, and a high-frequency 106-tone RU is the 2$^{nd}$ 106-tone RU in the 3$^{rd}$ row in FIG. 2C.

In addition, in this specification, that a frequency band range is "lower-frequency adjacent to" or "higher-frequency adjacent to" another frequency band range means that the two frequency band ranges are nearest. For example, in FIG. 23, relative to the 2$^{nd}$ 80-MHz frequency band range, the 1$^{st}$ 80-MHz frequency band range may be referred to as a frequency band range lower-frequency adjacent to the 2$^{nd}$ 80-MHz frequency band range; and, relative to the 1$^{st}$ 80-MHz frequency band range, the 2$^{nd}$ 80-MHz frequency band range may be referred to as a frequency band range higher-frequency adjacent to the 1$^{st}$ 80-MHz frequency band range.

FIG. 12 and FIG. 13 are used as examples to describe a solution of combining a 106-tone RU and a 26-tone RU in a 20-MHz frequency band range in 80 MHz. In other words, the station actually uses the 106-tone RU and the 26-tone RU to transmit the EHT TB PPDU.

FIG. 12 is a schematic diagram of a combination of a 106-tone RU and a 26-tone RU according to an embodiment of this application. RU distribution shown in FIG. 12 is RU distribution in a 20-MHz frequency band range in 80 MHz. A solution of combining a low-frequency 106-tone RU in the 20-MHz frequency band range and a center 26-tone RU in the 20-MHz frequency band range is shown in FIG. 12. For example, 72 to 75 may be separately used to indicate solutions corresponding to four 20-MHz frequency band ranges that are at different positions in the 80 MHz.

FIG. 13 is another schematic diagram of a combination of a 106-tone RU and a 26-tone RU according to an embodiment of this application. RU distribution shown in FIG. 13 is RU distribution in a 20-MHz frequency band range in 80 MHz. A solution of combining a high-frequency 106-tone RU in the 20-MHz frequency band range and a center 26-tone RU in the 20-MHz frequency band range is shown in FIG. 13. For example, 76 to 79 may be separately used to indicate solutions corresponding to four 20-MHz frequency band ranges that are at different positions in the 80 MHz.

FIG. 14 to FIG. 17 are used as examples to describe a solution of combining a 52-tone RU and a 26-tone RU in a 20-MHz frequency band range in 80 MHz. In other words, the station actually uses the 52-tone RU and the 26-tone RU to transmit the EHT TB PPDU.

FIG. 14 is a schematic diagram of a combination of a 52-tone RU and a 26-tone RU according to an embodiment of this application. RU distribution shown in FIG. 14 is RU distribution in a 20-MHz frequency band range in 80 MHz. A solution of combining a 52-tone RU having a second lowest frequency in the 20-MHz frequency band range and a 26-tone RU that is on a same side with and adjacent to the 52-tone RU and that is in the 20-MHz frequency band range is shown in FIG. 14. For example, 80 to 83 may be separately used to indicate solutions corresponding to four 20-MHz frequency band ranges that are at different positions in the 80 MHz.

FIG. 15 is another schematic diagram of a combination of a 52-tone RU and a 26-tone RU according to an embodiment of this application. RU distribution shown in FIG. 15 is RU distribution in a 20-MHz frequency band range in 80 MHz. A solution of combining a 52-tone RU having a second lowest frequency in the 20-MHz frequency band range and a center 26-tone RU in the 20-MHz frequency band range is shown in FIG. 15. For example, 84 to 87 may be separately used to indicate solutions corresponding to four 20-MHz frequency band ranges that are at different positions in the 80 MHz.

FIG. 16 is another schematic diagram of a combination of a 52-tone RU and a 26-tone RU according to an embodiment of this application. RU distribution shown in FIG. 16 is RU distribution in a 20-MHz frequency band range in 80 MHz. A solution of combining a 52-tone RU having a second highest frequency in the 20-MHz frequency band range and a 26-tone RU that is on a same side with and adjacent to the 52-tone RU and that is in the 20-MHz frequency band range is shown in FIG. 16. For example, 88 to 91 may be separately used to indicate solutions corresponding to four 20-MHz frequency band ranges that are at different positions in the 80 MHz.

FIG. 17 is another schematic diagram of a combination of a 52-tone RU and a 26-tone RU according to an embodiment of this application. RU distribution shown in FIG. 17 is RU distribution in a 20-MHz frequency band range in 80 MHz. A solution of combining a 52-tone RU having a second highest frequency in the 20-MHz frequency band range and a center 26-tone RU in the 20-MHz frequency band range is shown in FIG. 17. For example, 92 to 95 may be separately used to indicate solutions corresponding to four 20-MHz frequency band ranges that are at different positions in the 80 MHz.

FIG. 18 to FIG. 21 are used as examples to describe a solution of combining a 484-tone RU and a 242-tone RU in 80 MHz. In other words, the station actually uses the 484-tone RU and the 242-tone RU to transmit the EHT TB PPDU.

FIG. 18 is a schematic diagram of a combination of a 484-tone RU and a 242-tone RU according to an embodiment of this application. RU distribution shown in FIG. 18 is RU distribution in 80 MHz. A solution of combining a low-frequency 484-tone RU in the 80 MHz and a continuous 242-tone RU is shown in FIG. 18. For example, 96 may be used to indicate a solution corresponding to a case in which the 484-tone RU is the low-frequency 484-tone RU.

FIG. 19 is another schematic diagram of a combination of a 484-tone RU and a 242-tone RU according to an embodiment of this application. RU distribution shown in FIG. 19 is RU distribution in 80 MHz. A solution of combining a high-frequency 484-tone RU in the 80 MHz and a continuous 242-tone RU is shown in FIG. 19. For example, 97 may be used to indicate a solution corresponding to a case in which the 484-tone RU is the high-frequency 484-tone RU.

FIG. 20 is another schematic diagram of a combination of a 484-tone RU and a 242-tone RU according to an embodiment of this application. RU distribution shown in FIG. 20 is RU distribution in 80 MHz. A solution of combining a low-frequency 484-tone RU in the 80 MHz and a discontinuous 242-tone RU is shown in FIG. 20. For example, 98 may be used to indicate a solution corresponding to a case in which the 484-tone RU is the low-frequency 484-tone RU.

FIG. 21 is another schematic diagram of a combination of a 484-tone RU and a 242-tone RU according to an embodiment of this application. RU distribution shown in FIG. 21 is RU distribution in 80 MHz. A solution of combining a high-frequency 484-tone RU in the 80 MHz and a discontinuous 242-tone RU is shown in FIG. 21. For example, 99 may be used to indicate a solution corresponding to a case in which the 484-tone RU is the high-frequency 484-tone RU.

FIG. 22 is used as an example tp describe a solution of combining two 242-tone RUs in 80 MHz. In other words, the station actually uses the two 242-tone RUs to transmit the EHT TB PPDU. FIG. 22 is a schematic diagram of a combination of two 242-tone RUs according to an embodiment of this application. RU distribution shown in FIG. 22 is RU distribution in 80 MHz. A solution of combining 242-tone RUs on outer sides of the 80 MHz is shown in FIG. 22. The "outer sides" are relative to the 80 MHz. Optionally, the two combined 242-tone RUs in FIG. 22 may also be referred to as 242-tone RUs on "two sides" of the 80 MHz. For example, 100 may be used to indicate this solution.

FIG. 23 and FIG. 24 are used as examples to describe a solution of combining a 996-tone RU and a 484-tone RU in 160 MHz. In other words, the station actually uses the 996-tone RU and the 484-tone RU to transmit the EHT TB PPDU.

FIG. 23 is a schematic diagram of a combination of a 996-tone RU and a 484-tone RU according to an embodiment of this application. RU distribution shown in FIG. 23 is RU distribution in 80 MHz and 80 MHz higher-frequency adjacent to the 80 MHz. A solution of combining a 996-tone RU corresponding to the 80 MHz and a 484-tone RU that is in the higher-frequency adjacent 80 MHz and that is not adjacent to the 996-tone RU is shown in FIG. 23. For example, 101 may be used to indicate a solution corresponding to a case in which the 484-tone RU is located in the higher-frequency adjacent 80 MHz.

FIG. 24 is another schematic diagram of a combination of a 996-tone RU and a 484-tone RU according to an embodiment of this application. RU distribution shown in FIG. 24 is RU distribution in 80 MHz and 80 MHz lower-frequency adjacent to the 80 MHz. A solution of combining a 996-tone RU corresponding to the 80 MHz and a 484-tone RU that is in the lower-frequency adjacent 80 MHz and that is not adjacent to the 996-tone RU is shown in FIG. 24. For example, 102 may be used to indicate a solution corresponding to a case in which the 484-tone RU is located in the lower-frequency adjacent 80 MHz.

FIG. 25 and FIG. 26 are used as examples to describe a solution of combining a 996-tone RU, a 484-tone RU, and a 242-tone RU in 160 MHz. In other words, the station actually uses the 996-tone RU, the 484-tone RU, and the 242-tone RU to transmit the EHT TB PPDU.

FIG. 25 is a schematic diagram of a combination of a 996-tone RU, a 484-tone RU, and a 242-tone RU according to an embodiment of this application. RU distribution shown in FIG. 25 is RU distribution in 80 MHz and 80 MHz higher-frequency adjacent to the 80 MHz. A solution of combining a 996-tone RU corresponding to the 80 MHz, and a 484-tone RU and a 242-tone RU that are in the higher-frequency adjacent 80 MHz and that are not adjacent to the 996-tone RU is shown in FIG. 25. For example, 103 may be used to indicate a solution corresponding to a case in which the 484-tone RU and the 242-tone RU are located in the higher-frequency adjacent 80 MHz.

FIG. 26 is another schematic diagram of a combination of a 996-tone RU, a 484-tone RU, and a 242-tone RU according to an embodiment of this application. RU distribution shown in FIG. 26 is RU distribution in 80 MHz and 80 MHz lower-frequency adjacent to the 80 MHz. A solution of combining a 996-tone RU corresponding to the 80 MHz, and a 484-tone RU and a 242-tone RU that are in the lower-frequency adjacent 80 MHz and that are not adjacent to the 996-tone RU is shown in FIG. 26. For example, 104 may be used to indicate a solution corresponding to a case in which the 484-tone RU and the 242-tone RU are located in the lower-frequency adjacent 80 MHz.

FIG. 27 and FIG. 28 are used as examples to describe a solution of combining a 996-tone RU and two 242-tone RUs in 160 MHz. In other words, the station actually uses the 996-tone RU and the two 242-tone RUs to transmit the EHT TB PPDU.

FIG. 27 is a schematic diagram of a combination of a 996-tone RU and two 242-tone RUs according to an embodiment of this application. RU distribution shown in FIG. 27 is RU distribution in 80 MHz and 80 MHz higher-frequency adjacent to the 80 MHz. A solution of combining a 996-tone RU corresponding to the 80 MHz and 242-tone RUs on two sides of the higher-frequency adjacent 80 MHz is shown in FIG. 27. For example, 105 may be used to indicate a solution corresponding to a case in which the two 242-tone RUs are located in the higher-frequency adjacent 80 MHz.

FIG. 28 is another schematic diagram of a combination of a 996-tone RU and two 242-tone RUs according to an embodiment of this application. RU distribution shown in FIG. 28 is RU distribution in 80 MHz and 80 MHz lower-frequency adjacent to the 80 MHz. A solution of combining a 996-tone RU corresponding to the 80 MHz and 242-tone RUs on two sides of the lower-frequency adjacent 80 MHz is shown in FIG. 28. For example, 106 may be used to indicate a solution corresponding to a case in which the two 242-tone RUs are located in the lower-frequency adjacent 80 MHz.

FIG. 29 is used as an example to describe a solution of combining a 484-tone RU, a 242-tone RU, a 484-tone RU, and a 242-tone RU in 160 MHz. In other words, the station actually uses the 484-tone RU, the 242-tone RU, the 484-tone RU, and the 242-tone RU to transmit the EHT TB PPDU. FIG. 29 is a schematic diagram of a combination of a 484-tone RU, a 242-tone RU, a 484-tone RU, and a 242-tone RU according to an embodiment of this application. RU distribution shown in FIG. 29 is RU distribution in 80 MHz and 80 MHz higher-frequency adjacent to the 80 MHz. A solution of combining a 484-tone RU and a 242-tone RU in the 80 MHz, and a 484-tone RU and a 242-tone RU in the higher-frequency adjacent 80 MHz is shown in FIG. 29.

As shown in FIG. 18 to FIG. 21, there are four solutions of selecting a 484-tone RU and a 242-tone RU in one piece of 80 MHz, and there are two pieces of 80 MHz in total, namely, the 80 MHz and the adjacent 80 MHz, so that there are 4*4=16 solutions of combining the 484-tone RU, the 242-tone RU, the 484-tone RU, and the 242-tone RU. Details are not described one by one herein. For example, 111 to 126 may be used to indicate the 16 solutions.

In a third possible implementation, the first resource unit indicated by the resource unit indication field is a plurality of resource units corresponding to any one of the following combinations: a combination of two 996-tone resource units in a 320-MHz frequency band range (corresponding to a case in which the value of the field is 68 to 70); a combination of four 996-tone resource units in a 320-MHz frequency band range (corresponding to a case in which the value of the field is 71); a combination of two 996-tone resource units having lowest frequencies and a 996-tone resource unit having a highest frequency in a 320-MHz frequency band range (corresponding to a case in which the value of the field is 107); a combination of a 996-tone resource unit having a lowest frequency and two 996-tone resource units having highest frequencies in a 320-MHz frequency band range (corresponding to a case in which the value of the field is 108); a combination of three 996-tone resource units having lowest frequencies in a 320-MHz frequency band range (corresponding to a case in which the value of the field is 109); and a combination of three 996-tone resource units having highest frequencies in a 320-MHz frequency band range (corresponding to a case in which the value of the field is 110).

For a distribution manner of the first resource unit, refer to FIG. 30 to FIG. 37. Each case is described in more detail below:

FIG. 30 to FIG. 33 are used as examples to describe a solution of combining three 996-tone RUs in 320 MHz. In other words, the station actually uses the three 996-tone RUs to transmit the EHT TB PPDU.

FIG. 30 is a schematic diagram of a combination of three 996-tone RUs according to an embodiment of this application. RU distribution shown in FIG. 30 is RU distribution in 320 MHz. FIG. 30 is a schematic diagram of a combination of two 996-tone RUs having lowest frequencies and a 996-tone RU having a highest frequency in the 320 MHz. For example, 107 may be used to indicate the solution.

FIG. 31 is another schematic diagram of a combination of three 996-tone RUs according to an embodiment of this application. RU distribution shown in FIG. 31 is RU distribution in 320 MHz. FIG. 31 is a schematic diagram of a combination of a 996-tone RU having a lowest frequency and two 996-tone RUs having highest frequencies in the 320 MHz. For example, 108 may be used to indicate the solution.

FIG. 32 is another schematic diagram of a combination of three 996-tone RUs according to an embodiment of this application. RU distribution shown in FIG. 32 is RU distribution in 320 MHz. FIG. 32 is a schematic diagram of a combination of three 996-tone RUs having lowest frequencies in the 320 MHz. For example, 109 may be used to indicate the solution.

FIG. 33 is another schematic diagram of a combination of three 996-tone RUs according to an embodiment of this application. RU distribution shown in FIG. 33 is RU distribution in 320 MHz. FIG. 33 is a schematic diagram of a combination of three 996-tone RUs having highest frequencies in the 320 MHz. For example, 110 may be used to indicate the solution.

FIG. 34 is used as an example to describe a solution of combining four 996-tone RUs in 320 MHz. In other words, the station actually uses the four 996-tone RUs to transmit the EHT TB PPDU. FIG. 34 is a schematic diagram of a combination of four 996-tone RUs according to an embodiment of this application. RU distribution shown in FIG. 34 is RU distribution in 320 MHz. For example, 71 may be used to indicate the solution.

FIG. 35 to FIG. 37 are used as examples to describe a solution of combining two 996-tone RUs in 320 MHz. In other words, the station actually uses the two 996-tone RUs to transmit the EHT TB PPDU. The two 996-tone RUs includes at least one 996-tone RU corresponding to the 1$^{st}$ 80 MHz (having a lowest frequency). FIG. 35 to FIG. 37 are schematic diagrams of some combinations of two 996-tone RUs according to an embodiment of this application. For example, 68 to 70 may separately indicate the three solutions.

Figure 38:
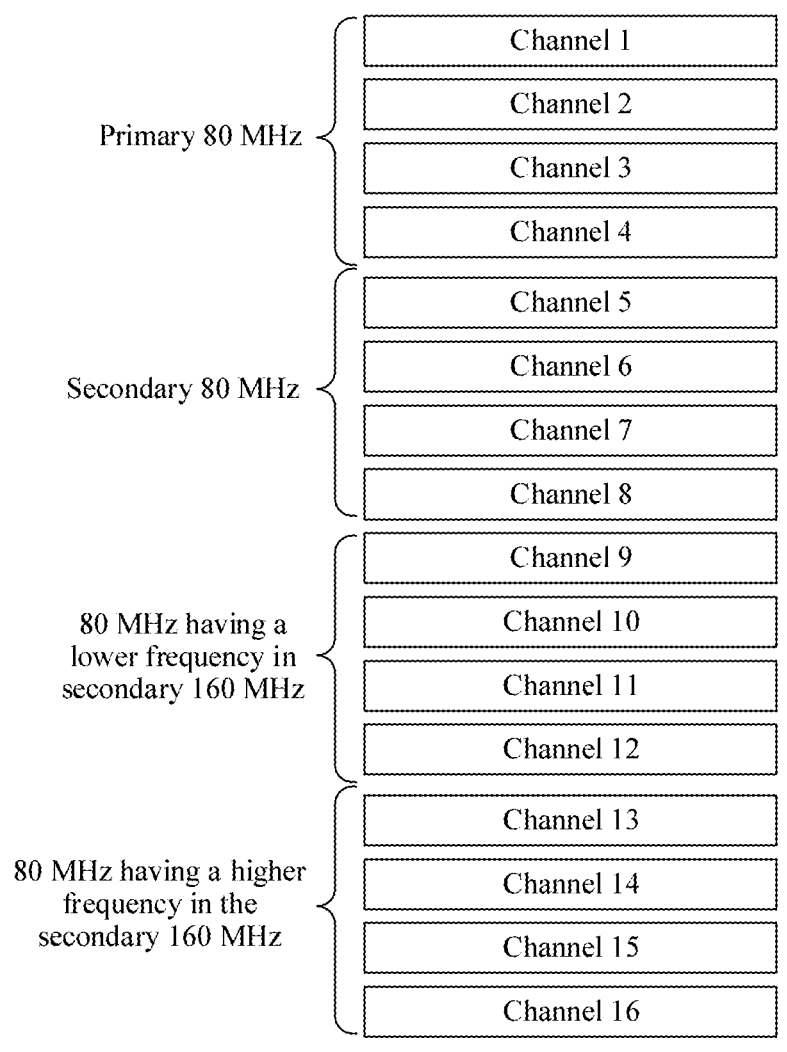
FIG. 38 is a schematic diagram of channel division according to an embodiment of this application.

It can be learned from a division manner of wireless channels that a bandwidth of 320 MHz may be divided into a plurality of pieces of 80 MHz. FIG. 38 is a schematic diagram of channel division according to an embodiment of this application. As shown in FIG. 38, when a bandwidth is 320 MHz, the bandwidth may be divided into primary 80 MHz, secondary 80 MHz, 80 MHz having a lower frequency in secondary 160 MHz, and 80 MHz having a higher frequency in the secondary 160 MHz. One 80-MHz channel may include four 20-MHz channels. Therefore, when a frequency band range used by the station is smaller than 320 MHz, the AP further needs to learn of a frequency position that is of the frequency band range used by the station and that is in a bandwidth.

In a possible implementation, the AP may determine, by using the trigger frame sent to the STA (or by using a stored record of allocating RUs to a plurality of STAs), a frequency position that is of a frequency band range corresponding to the first resource unit used by the STA and that is in the bandwidth. In this implementation, the EHT TB PPDU may include only the resource unit indication field described in the foregoing content.

In another possible implementation, the EHT TB PPDU may further include a frequency band range indication field, where the frequency band range indication field is used to indicate a frequency position of the 80-MHz frequency band range (refer to the first implementation and the second implementation described in the foregoing content) in a bandwidth, and the 80-MHz frequency band range is any one of the following: primary 80 MHz, secondary 80 MHz, 80 MHz having a lower frequency in secondary 160 MHz, and 80 MHz having a higher frequency in the secondary 160 MHz.

The following further describes the frequency band range indication field.

It should be noted that a bandwidth of a wireless local area network may include 20 MHz, 40 MHz, 80 MHz, 160 MHz, 240 MHz, 320 MHz, and the like. For a bandwidth of 20 MHz, 40 MHz, or 80 MHz, the station may use the resource unit indication field to directly indicate one resource unit in the bandwidth. For a bandwidth greater than or equal to 160 MHz, for example, 160 MHz, 240 MHz, or 320 MHz, the station may use the frequency band range indication field to indicate one piece of 80 MHz in which the 80-MHz frequency band range is located in the bandwidth.

Optionally, if the frequency band range used by the station is equal to 320 MHz (refer to the cases shown in FIG. 30 to FIG. 37), the frequency band range indication field may be ignored. That is, the EHT TB PPDU may not include the frequency band range indication field. It may be understood that, in this case, to ensure that a frame length remains unchanged, the EHT TB PPDU may alternatively include the frequency band range indication field. In this case, the frequency band range indication field may not indicate any information.

Refer to Table 5. Table 5 shows a relationship among a frequency band range indication field, a bandwidth, and a frequency band range according to an embodiment of this application. As shown in Table 5, for a bandwidth of 20 MHz, 40 MHz, or 80 MHz, the EHT TB PPDU may not include the frequency band range indication field. For a bandwidth of 160 MHz, the frequency band range indication field may occupy one bit, that is, a quantity of required bits is 1. If the frequency band range indication field is equal to 0, it indicates that the 80-MHz frequency band range is primary 80 MHz in the bandwidth. If the frequency band range indication field is equal to 1, it indicates that the 80-MHz frequency band range is secondary 80 MHz in the bandwidth.

For a bandwidth of 320 MHz, the frequency band range indication field may occupy two bits, that is, a quantity of required bits is 2. If the frequency band range indication field is equal to 0, it indicates that the 80-MHz frequency band range is primary 80 MHz in the bandwidth. If the frequency band range indication field is equal to 1, it indicates that the 80-MHz frequency band range is secondary 80 MHz in the bandwidth. If the frequency band range indication field is equal to 3, it indicates that the 80-MHz frequency band range is 80 MHz having a lower frequency in secondary 160 MHz. If the frequency band range indication field is equal to 4, it indicates that the 80-MHz frequency band range is 80 MHz having a higher frequency in the secondary 160 MHz. In addition, in Table 5, a correspondence between each value of the frequency band range indication field and each 80-MHz frequency band range may be adjusted. This is not limited in this embodiment of this application.

TABLE 5

| Bandwidth (BW) | Frequency band range indication field | Bit quantity |
|---|---|---|
| 20 MHz, 40 MHZ, and 80 MHz | 0 | 0 |
| 160 MHz | 0: primary 80 MHz (which is also referred to as the 1st 80 MHz or low-frequency 80 MHz) 1: secondary 80 MHz (which is also referred to as the 2nd 80 MHz or high-frequency 80 MHz) | 1 |
| 320 MHz | 0: primary 80 MHz (which is also referred to as the 1st 80 MHz or 80 MHz having a lowest frequency) 1: secondary 80 MHz (which is also referred to as the 2nd 80 MHz, 80 MHz in the 2nd low-frequency part, or 80 MHz in a secondary-lowest-frequency part) 2: 80 MHz having a lower frequency in secondary 160 MHz (which is also referred to as the 3rd 80 MHz or 80 MHz in a secondary-highest-frequency part) 3: 80 MHz having a higher frequency in the secondary 160 MHz (which is also referred to as the 4th 80 MHz or 80 MHz in a highest-frequency part) | 2 |

The first indication manner in which the resource unit indication field indicates the first resource unit is described in the foregoing content, and the following describes a second indication manner.

In the second indication manner, the resource unit indication field includes bits of a first preset length, and a position of one of the bits in the bits corresponds to a position of a unit channel in a total channel. It should be noted that, the correspondence between the positions may be that positions from left to right in the bits correspond to positions from low to high in frequencies of the total channel.

Refer to the schematic diagram of channel division shown in FIG. 38, in a possible implementation, the unit channel may be a 20-MHz channel, and the total channel may be an 80-MHz channel. In this case, the first preset length may be four, and a position of one of the four bits in the four bits corresponds to a position of a unit channel (20 MHz) in the total channel (80 MHz). For example, if the STA actually uses a channel corresponding to the $2^{nd}$ 20 MHz in the 80 MHz, the resource unit indication field may be "0100". In other words, a channel corresponding to the first resource unit is the channel corresponding to the $2^{nd}$ 20 MHz in the 80 MHz.

When a bit is a first value (for example, 1), a unit channel corresponding to the bit is included in the channel corresponding to the first resource unit. When the bit is a second value (for example, 0), a unit channel corresponding to the bit is not included in the channel corresponding to the first resource unit. It should be noted that the first value and the second value are merely examples, and other values may be used during actual application.

In another possible implementation, the unit channel may be a 20-MHz channel, and the total channel may be a 160-MHz channel. In this case, the first preset length may be eight, and a position of one of the eight bits in the eight bits corresponds to a position of a unit channel (20 MHz) in the total channel (160 MHz). For example, if the STA actually uses channels corresponding to the $1^{st}$, the $2^{nd}$, the $3^{rd}$, the $4^{th}$, the $7^{th}$, and the $8^{th}$ 20 MHz in the 160 MHz (as shown in FIG. 23), the resource unit indication field may be "11110011". In other words, channels corresponding to the first resource unit are the channels corresponding to the $1^{st}$, the $2^{nd}$, the $3^{rd}$, the $4^{th}$, the $7^{th}$, and the $8^{th}$ 20 MHz in the 160 MHz.

Similarly, in some other possible implementations, the unit channel may be a 20-MHz channel, and the total channel may be a 320-MHz channel. Alternatively, the unit channel may be a 40-MHz channel, and the total channel may be an 80-MHz channel. Alternatively, the unit channel may be a 40-MHz channel, and the total channel may be a 160-MHz channel. Alternatively, the unit channel may be a 40-MHz channel, and the total channel may be a 320-MHz channel. Alternatively, the unit channel may be an 80-MHz channel, and the total channel may be a 160-MHz channel. Alternatively, the unit channel may be an 80-MHz channel, and the total channel may be a 320-MHz channel, or the like. For bits included in the resource unit indication field, refer to the descriptions in the foregoing content.

In a third indication manner, the resource unit indication field includes bits of a second preset length, where a position of one of the bits in the bits corresponds to a position of a unit channel in a frequency band range corresponding to the resource unit (namely, the second resource unit in the foregoing content) allocated to the station. Alternatively, two (or another quantity) bits may correspond to a unit channel. It should be noted that, the correspondence between the positions may be that positions from left to right in the bits correspond to positions from low to high in frequencies of the frequency band range. In addition, the frequency band range corresponding to the resource unit allocated to the station may be a plurality of discrete parts.

For example, Table 6 shows a correspondence between a size of the resource unit allocated to the station and a value of the second preset length. It may also be understood that the second preset length is equal to a quantity of 20-MHz sub-channels included in the frequency band range corresponding to the resource unit allocated to the station. In this example, the unit channel is 20 MHz. The unit channel may alternatively be another value. When values are different, the correspondence is correspondingly changed. Details are not described one by one herein.

TABLE 6

| RU size (tone) | Value of the second preset length |
|---|---|
| 484 | 2 |
| 996 | 4 |
| 2 * 996 | 8 |
| 3 * 996 | 12 |
| 4 * 996 | 16 |
| 242 + 484 | 3 |
| 242 + 484 + 996 | 7 |
| 484 + 996 | 6 |
| 484 + 2 * 996 | 10 |
| 484 + 3 * 996 | 14 |
| Largest value (4 * 996) | 16 |

For example, if the resource unit allocated to the station is "242+484", for example, referring to FIG. 20, the RU allocated to the station is the low-frequency 484-tone RU in the 80 MHz and the 242-tone RU that is not adjacent to the 484-tone RU, the value of the second preset length is 3. If the station actually uses the low-frequency 484-tone RU in the two RUs to transmit the EHT TB PPDU, the resource unit indication field may be "110". If the station actually uses a channel corresponding to low-frequency 20 MHz in the low-frequency 484-tone RU in the two RUs to transmit the EHT TB PPDU, the resource unit indication field may be "100".

When a bit is a first value (for example, 1), a unit channel corresponding to the bit is included in the channel corresponding to the first resource unit. When the bit is a second value (for example, 0), a unit channel corresponding to the bit is not included in the channel corresponding to the first resource unit. It should be noted that the first value and the second value are merely examples, and other values may be used during actual application.

In a fourth indication manner, the resource unit indication field includes bits of a third preset length, where a position of one of the bits in the bits corresponds to a position of a resource unit in the resource unit (namely, the second resource unit in the foregoing content) allocated to the station. Alternatively, two (or another quantity) bits may correspond to a resource unit. It should be noted that, the correspondence between the positions may be that positions from left to right in the bits correspond to positions from low to high in frequencies of a plurality of resource units. In addition, the plurality of resource units allocated to the station may be a plurality of discrete RUs.

For example, Table 7 shows a correspondence between a size of the resource unit allocated to the station and a value of the third preset length. It may also be understood that the third preset length is equal to a quantity of single RUs included in the plurality of RUs.

TABLE 7

| RU size (tone) | Value of the third preset length |
|---|---|
| 484 | N/A |
| 996 | N/A |
| 2 * 996 | 2 |
| 3 * 996 | 3 |
| 4 * 996 | 4 |
| 242 + 484 | 2 |
| 242 + 484 + 996 | 3 |
| 484 + 996 | 2 |
| 484 + 2 * 996 | 3 |
| 484 + 3 * 996 | 4 |
| Largest value (4 * 996) | 4 |

For example, if the resource unit allocated to the station is "242+484", for example, referring to FIG. 20, the RU allocated to the station is the low-frequency 484-tone RU in the 80 MHz and the 242-tone RU that is not adjacent to the 484-tone RU, the value of the third preset length is 2. If the station actually uses the 484-tone RU in the two RUs to transmit the EHT TB PPDU, the resource unit indication field may be "10". If the station actually uses the 242-tone RU in the two RUs to transmit the EHT TB PPDU, the resource unit indication field may be "01".

When a bit is a first value (for example, 1), a resource unit corresponding to the bit is included in the first resource unit. When the bit is a second value (for example, 0), a resource unit corresponding to the bit is not included in the first resource unit. It should be noted that the first value and the second value are merely examples, and other values may be used during actual application.

It should be noted that, for the third indication manner, a quantity of bits included in the resource unit indication field may alternatively be a fixed length (for example, 16 bits). When RU sizes are different, first N bits in the fixed length may be used. For a value of N, refer to the value of the second preset length shown in Table 6. Similarly, for the fourth indication manner, a quantity of bits included in the resource unit indication field may alternatively be a fixed length (for example, 4 bits). When RU sizes are different, first M bits in the fixed length may be used. For a value of M, refer to the value of the third preset length shown in Table 7.

Based on the descriptions of the foregoing content, the following describes some possible solutions extended in the embodiments of this application.

In some embodiments, for a station to which a plurality of RUs are allocated, the following rules may be adopted for a channel corresponding to a first resource unit selected by the station.

Rule 1: The station may select, as the channel corresponding to the first resource unit, any one or more unit (for example, 20 MHz) sub-channels in a channel corresponding to an allocated second resource unit. In this manner, a spectrum utilization rate can be maximized.

Rule 2: A remaining channel may form a single RU (for example, a 242-tone RU, a 484-tone RU, a 996-tone RU, a 2*996-tone RU, or a 3*996-tone RU) supported by a standard. The remaining channel is a channel other than the channel corresponding to the first resource unit in the channel corresponding to the allocated second resource unit. In this manner, a transmission mode that needs to be supported by the AP and the STA can be simplified.

Rule 3: The remaining channel may form a single RU (for example, a 242-tone RU, a 484-tone RU, a 996-tone RU, a 2*996-tone RU, or a 3*996-tone RU) supported by a standard, or may form a plurality of RUs supported by a standard (refer to the descriptions of the solution of combining a plurality of RUs in the foregoing content). In this manner, a transmission mode that needs to be supported by the AP and the STA and a spectrum utilization rate can be comprehensively considered.

In some embodiments, for a STA to which a single RU is allocated, the foregoing rules may also be adopted to a channel corresponding to a first resource unit selected by the station. In addition, a rule 4 may further be included: The STA to which the single RU is allocated is not allowed to transmit an EHT TB PPDU on a part of sub-channels in the channel corresponding to the allocated second resource unit.

In some embodiments, for the case, described in the foregoing content, in which the resource unit indication field in located in the EHT-SIG, and the STA to which the single RU is allocated is not allowed to transmit the EHT TB PPDU on the part of sub-channels in the channel corresponding to the allocated second resource unit, there may be the following two feasible solutions of designing the EHT TB PPDU.

In a feasible solution, for the STA to which no MRU is allocated (that is, to which the single RU is allocated), a part of the EHT TB PPDU corresponding to the STA may also include the EHT-SIG. In this manner, alignment of the fields can be ensured, and a peak-to-average power ratio (PAPR) of the EHT TB PPDU is ensured. Optionally, in this solution, content included in the EHT-SIG may not be limited, or may include a uniform fixed pseudo-random sequence. For example, an EHT-LTF sequence may be used.

In another feasible solution, for the STA to which no MRU is allocated (that is, to which the single RU is allocated), a part of the EHT TB PPDU corresponding to the STA may not include the EHT-SIG. Optionally, a length of a symbol including the EHT-SIG and a data field is the same as a length of a symbol that does not include the EHT-SIG and includes only a data field. In this manner, a problem of adjacent-band interference can be avoided.

Figures 39, 40:
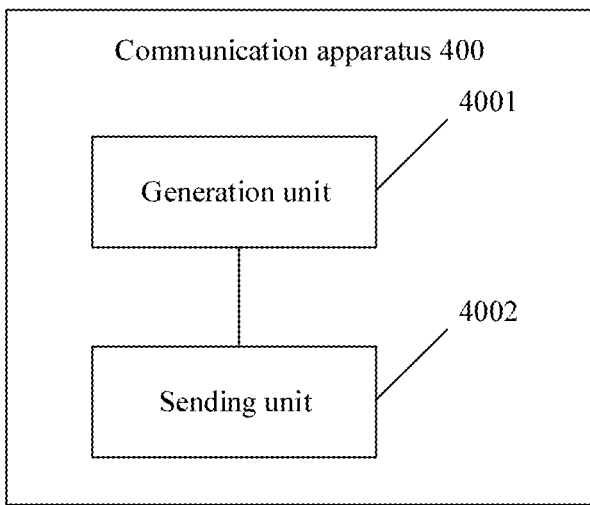
FIG. 39 is a schematic diagram of a part of a frame format of an EHT TB PPDU according to an embodiment of this application.
FIG. 40 is a schematic diagram of a structure of a communication apparatus according to an embodiment of this application.

For example, FIG. 39 is a schematic diagram of a part of a frame format of an EHT TB PPDU according to an embodiment of this application. In this example, a resource unit indication field in an EHT-SIG uses the second indication manner described in the foregoing content. One unit channel is a 20-MHz channel, and a total channel is a 320-MHz channel (where only the first 160 MHz is illustrated). A 484+242-tone RU is allocated to the STA 1 on the $1^{st}$ 80 MHz, a 484+242-tone RU is allocated to the STA 2 on the $2^{nd}$ 80 MHz, a 242-tone RU is allocated to the STA 3 on the $1^{st}$ 80 MHz, and a 242-tone RU is allocated to the STA 4 on the $2^{nd}$ 80 MHz. After carrier sensing, the STA 1 is idle on channels on the $1^{st}$ 20 MHz and the $3^{rd}$ 20 MHz, so that a resource unit indication field of the STA 1 may be "1010 0000 0000 0000" The STA 2 is idle on channels on the $5^{th}$ 20 MHz, the $6^{th}$ 20 MHz, and the $7^{th}$ 20 MHz, so that a resource unit indication field of the STA 2 may be "0000 1110 0000 0000".

For the STA 3 and the STA 4, because a single RU is allocated to both the STA 3 and the STA 4, a part of an EHT TB PPDU corresponding to each of the STA 3 and the STA 4 may not include an EHT-SIG. For example, a length of a data field in the EHT TB PPDU corresponding to each of the STA 3 and the STA 4 is the same as a total length of a data field and an EHT-SIG in an EHT TB PPDU corresponding to each of the STA 1 and the STA 2.

In some embodiments, in addition to the resource unit indication field, the EHT-SIG may further include a field indicating another physical layer parameter that can be determined by the STA, for example, a modulation and coding scheme (MCS).

To implement functions in the foregoing methods provided in the embodiments of this application, the first device and the second device may include a hardware structure and a software 30) module, and implement the foregoing functions in a form of the hardware structure, the software module, or a combination of the hardware structure and the software module. A function in the foregoing functions may be performed in a manner of the hardware structure, the software module, or a combination of the hardware structure and the software module.

The foregoing describes the method embodiments of this application, and the following describes corresponding apparatus embodiments.

FIG. 40 is a schematic diagram of a structure of a communication apparatus according to an embodiment of this application. The communication apparatus 400 may be a station, an apparatus in the station, or an apparatus that can match an access point. The communication apparatus 400 may alternatively be an access point, an apparatus in the access point, or an apparatus that can match a station. The communication apparatus 400 may alternatively be a multi-link device. The communication apparatus 400 includes a generation unit 4001 and a sending unit 4002.

Specifically, the generation unit 4001 is configured to generate an EHT TB PPDU. The EHT TB PPDU includes a resource unit indication field, the resource unit indication field is used to indicate a first resource unit used by the communication apparatus to transmit the EHT TB PPDU, the first resource unit is included in a second resource unit, and the second resource unit is one or more resource units allocated to the communication apparatus. Specifically, for an operation performed by the generation unit 4001, refer to the descriptions in step S101 in the method shown in FIG. 7. For the EHT TB PPDU, refer to the descriptions in the embodiments corresponding to FIG. 9 to FIG. 11.

The sending unit 4002 is configured to send the EHT TB PPDU to a second device. Specifically, for an operation performed by the sending unit 4002, refer to the descriptions in step S102 in the method shown in FIG. 7.

In some embodiments, the EHT TB PPDU includes a universal signal field U-SIG, and the resource unit indication field is located in the U-SIG of the EHT TB PPDU. For example, reference may be made to the content in the embodiment corresponding to FIG. 11.

In some embodiments, the EHT TB PPDU includes a U-SIG, a high efficiency short training field EHT-STF, and a high efficiency signal field EHT-SIG, the resource unit indication field is located in the EHT-SIG, and the EHT-SIG is located between the U-SIG and the EHT-STF. For example, reference may be made to the content in the embodiment corresponding to FIG. 10.

In some embodiments, the EHT TB PPDU includes a high efficiency long training field EHT-LTF, a high efficiency signal field EHT-SIG, and a data field, the resource unit indication field is located in the EHT-SIG, and the EHT-SIG is located between the EHT-LTF and the data field. For example, reference may be made to the content in the embodiment corresponding to FIG. 9.

In some embodiments, the communication apparatus 400 further includes a receiving unit 4003, and the receiving unit 4003 is configured to receive a trigger frame sent by the second device. The trigger frame includes a common information field and a user information field that is the same as an association identifier of the communication apparatus, the user information field is used to indicate the second resource unit, the common information field or the user information field includes an indication field, and the indication field is used to indicate that the communication apparatus is allowed to transmit the EHT TB PPDU in a part of the second resource unit.

In some embodiments, the communication apparatus 400 further includes a storage unit 4004. The storage unit 4004 is configured to store an index table, and the index table is used to indicate a correspondence between a value of the resource unit indication field and the first resource unit.

In some embodiments, the first resource unit indicated by the resource unit indication field is any one of the following resource units: any 26-subcarrier tone resource unit in an 80-MHz frequency band range; any 52-tone resource unit in an 80-MHz frequency band range; any 106-tone resource unit in an 80-MHz frequency band range; any 242-tone resource unit in an 80-MHz frequency band range; any 484-tone resource unit in an 80-MHz frequency band range; and any 996-tone resource unit corresponding to an 80-MHz frequency band range.

In some embodiments, the first resource unit indicated by the resource unit indication field is a plurality of resource units corresponding to any one of the following combinations: a combination of a 106-tone resource unit having a lowest frequency in a 20-MHz frequency band range in an 80-MHz frequency band range and a center 26-tone resource unit in the 20-MHz frequency band range; a combination of a 106-tone resource unit having a highest frequency in a 20-MHz frequency band range in an 80-MHz frequency band range and a center 26-tone resource unit in the 20-MHz frequency band range; a combination of a 52-tone resource unit having a second lowest frequency in a 20-MHz frequency band range in an 80-MHz frequency band range and a 26-tone resource unit that is on a same side with and adjacent to the 52-tone resource unit and that is in the 20-MHz frequency band range; a combination of a 52-tone resource unit having a second lowest frequency in a 20-MHz frequency band range in an 80-MHz frequency band range and a center 26-tone resource unit in the 20-MHz frequency band range; a combination of a 52-tone resource unit having a second highest frequency in a 20-MHz frequency band range in an 80-MHz frequency band range and a 26-tone resource unit that is on a same side and adjacent to with the 52-tone resource unit and that is in the 20-MHz frequency band range; a combination of a 52-tone resource unit having a second highest frequency in a 20-MHz frequency band range in an 80-MHz frequency band range and a center 26-tone resource unit in the 20-MHz frequency band range; a combination of a 484-tone resource unit in an 80-MHz frequency band range and a 242-tone resource unit adjacent to the 484-tone resource unit; a combination of a 484-tone resource unit in an 80-MHz frequency band range and a 242-tone resource unit that is not adjacent to the 484-tone resource unit; a combination of two 242-tone resource units on two sides in an 80-MHz frequency band range; a combination of a 996-tone resource unit corresponding to an 80-MHz frequency band range and a 484-tone resource unit that is in an 80-MHz frequency band range adjacent to the 996-tone resource unit and that is not adjacent to the 996-tone resource unit; a combination of a 996-tone resource unit corresponding to an 80-MHz frequency band range, and a 484-tone resource unit and a 242-tone resource unit that are in an 80-MHz frequency band range adjacent to the 996-tone resource unit and that are not adjacent to the 996-tone resource unit; and a combination of a 484-tone resource unit and a 242-tone resource unit in an 80-MHz frequency band range, and a 484-tone resource unit and a 242-tone resource unit in an 80-MHz frequency band range adjacent to the 80-MHz frequency band range.

In some embodiments, the EHT TB PPDU further includes a frequency band range indication field, the frequency band range indication field is used to indicate a frequency position of the 80-MHz frequency band range in a bandwidth, and the 80-MHz frequency band range is any one of the following: primary 80 MHz, secondary 80 MHz, 80 MHz having a lower frequency in secondary 160 MHz, and 80 MHz having a higher frequency in the secondary 160 MHz.

In some embodiments, the first resource unit indicated by the resource unit indication field is a plurality of resource units corresponding to any one of the following combinations: a combination of two 996-tone resource units in a 320-MHz frequency band range; a combination of four 996-tone resource units in a 320-MHz frequency band range; a combination of two 996-tone resource units having lowest frequencies and a 996-tone resource unit having a highest frequency in a 320-MHz frequency band range; a combination of a 996-tone resource unit having a lowest frequency and two 996-tone resource units having highest frequencies in a 320-MHz frequency band range; a combination of three 996-tone resource units having lowest frequencies in a 320-MHz frequency band range; and a combination of three 996-tone resource units having highest frequencies in a 320-MHz frequency band range.

In some embodiments, the resource unit indication field includes bits of a first preset length, and a position of one of the bits in the bits corresponds to a position of a unit channel in a total channel.

In some embodiments, the resource unit indication field includes bits of a second preset length, and a position of one of the bits in the bits corresponds to a position of a unit channel in a frequency band range corresponding to the second resource unit.

In some embodiments, when the one bit is a first value, the unit channel corresponding to the one bit is included in a channel corresponding to the first resource unit; or when the one bit is a second value, the unit channel corresponding to the one bit is not included in a channel corresponding to the first resource unit.

In some embodiments, the resource unit indication field includes bits of a third preset length, and a position of one of the bits in the bits corresponds to a position of a resource unit in the second resource unit.

In some embodiments, when the one bit is a first value, the resource unit corresponding to the one bit is included in the first resource unit; or when the one bit is a second value, the resource unit corresponding to the one bit is not included in the first resource unit.

It should be noted that the operations performed by the units of the communication apparatus shown in FIG. 40 may be the related content in the foregoing method embodiments. Details are not described herein again. The foregoing units may be implemented in a manner of hardware, software, or a combination of software and hardware. In an embodiment, the functions of the generation unit 4001 and the sending unit 4002 in the foregoing content may be implemented by one or more processors in the communication apparatus 400.

The communication apparatus shown in FIG. 40 may be used to generate the EHT TB PPDU and send the EHT TB PPDU to the second device. The EHT TB PPDU includes the resource unit indication field, the resource unit indication field may indicate the first resource unit used by the communication apparatus to transmit the EHT TB PPDU, and the first resource unit is included in the resource unit allocated to the communication apparatus. This communication apparatus may notify; by using the EHT TB PPDU, the second device of the RU used by the communication apparatus to actually transmit the EHT TB PPDU.

Figure 41:
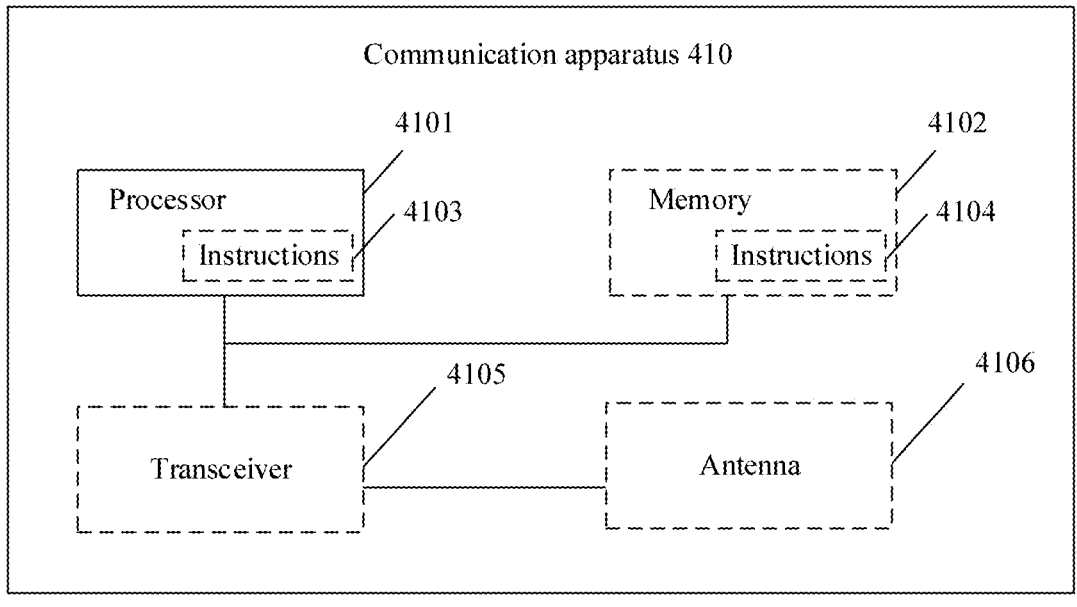
FIG. 41 is another schematic diagram of a structure of a communication apparatus according to an embodiment of this application.

FIG. 41 is another schematic diagram of a structure of a communication apparatus according to an embodiment of this application. The communication apparatus 410 may be an access point, or may be a station, or may be a chip, a chip system, a processor, or the like that supports the access point in implementing the foregoing method, or may be a chip, a chip system, a processor, or the like that supports the station in implementing the foregoing method. The apparatus may be configured to implement the methods described in the foregoing method embodiments. For details, refer to the descriptions in the foregoing method embodiments.

The communication apparatus 410 may include one or more processors 4101. The processor 4101 may be a general-purpose processor, a special-purpose processor, or the like. The processor 4101 may be configured to control the communication apparatus (for example, an access point, an access point chip, a station, or a station chip), execute a software program, and process data of the software program.

Optionally, the communication apparatus 4100 may include one or more memories 4102. The memory 4102 may store instructions 4104, and the instructions may be run on the processor 4101, to enable the communication apparatus 4100 to perform the method described in the foregoing method embodiments. Optionally, the memory 4102 may further store data. The processor 4101 and the memory 4102 may be separately disposed, or may be integrated together.

Optionally, the communication apparatus 4100 may further include a transceiver 4105 and an antenna 4106. The transceiver 4105 may be referred to as a transceiver unit, a transceiver machine, a transceiver circuit, or the like, and is configured to implement a transceiver function. The transceiver 4105 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The processor 4101 is configured to perform the operation of generating an EHT TB PPDU in step S102 in FIG. 7. The EHT TB PPDU includes a resource unit indication field, the resource unit indication field is used to indicate a first resource unit used by the communication apparatus to transmit the EHT TB PPDU, the first resource unit is included in a second resource unit, and the second resource unit is one or more resource units allocated to the communication apparatus.

The processor 4101 is further configured to perform, by using the transceiver 4105, the operation of sending the EHT TB PPDU in step S102 in FIG. 7.

Tn operation performed by the processor 4101 may be the related content in the foregoing method embodiments. Details are not described herein again.

In another possible design, the transceiver may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, optionally, the processor 4101 may store instructions 4103. When the instructions 4103 are run on the processor 4101, the communication apparatus 4100 is enabled to perform the method described in the foregoing method embodiments. The instructions 4103 may be fixed in the processor 4101. In this case, the processor 4101 may be implemented by hardware.

In another possible design, the communication apparatus 4100 may include a circuit. The circuit may implement a sending, receiving, or communication function in the foregoing method embodiments.

The processor and the transceiver that are described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like.

The communication apparatus described in the foregoing embodiment may be an access point or a station. However, a scope of the communication apparatus described in this application is not limited thereto, and a structure of the communication apparatus may not be limited in FIG. 41. The communication apparatus may be an independent device or may be a part of a relatively large device. For example, the communication apparatus may be:

(1) an independent integrated circuit IC, a chip, or a chip system or subsystem;

(2) a set including one or more ICs, where optionally, the IC set may further include a storage component configured to store data and instructions;

(3) an ASIC, for example, a modem;

(4) a module that can be embedded in another device;

(5) a receiver, an intelligent terminal, a wireless device, a handheld device, a mobile unit, a vehicle-mounted device, a cloud device, an artificial intelligence device, and the like;

(6) others, or the like.

Figure 42:
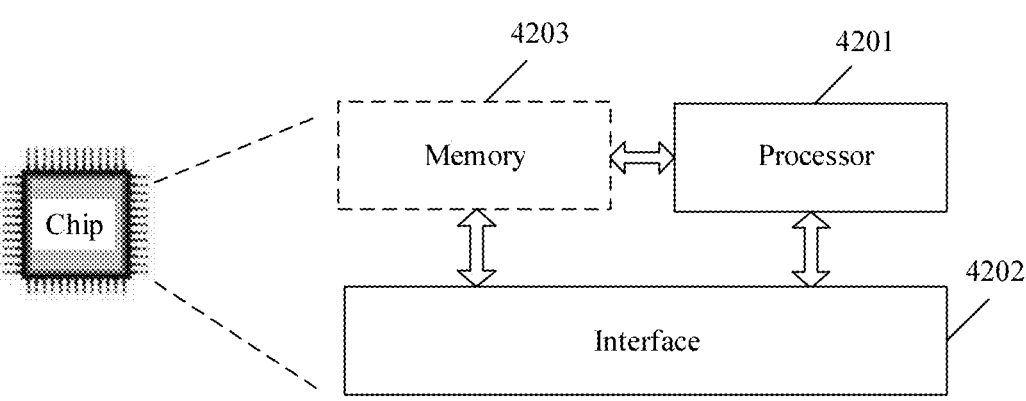
FIG. 42 is a schematic diagram of a structure of a chip according to an embodiment of this application.

For a case in which the communication apparatus may be a chip or a chip system, refer to a schematic diagram of a structure of a chip shown in FIG. 42. The chip 4200 shown in FIG. 42 includes a processor 4201 and an interface 4202. There may be one or more processors 4201, and there may be a plurality of interfaces 4202.

A case in which the chip is configured to implement the function of the first device in the embodiments of this application is described below:

The processor 4201 is configured to generate an EHT TB PPDU. The EHT TB PPDU includes a resource unit indication field, the resource unit indication field is used to indicate a first resource unit used by a communication apparatus to transmit the EHT TB PPDU, the first resource unit is included in a second resource unit, and the second resource unit is one or more resource units allocated to the communication apparatus.

The interface 4202 is configured to send the EHT TB PPDU.

Optionally, the chip further includes a memory 4203, and the memory 4203 is configured to store program instructions and data that are necessary for a terminal device.

A person skilled in the art may further understand that various illustrative logical blocks and steps that are listed in the embodiments of this application may be implemented by electronic hardware, computer software, or a combination thereof. Whether the functions are implemented by hardware or software depends on a particular application and a design requirement of the entire system. A person skilled in the art may use various methods to implement the described functions for each particular application, but it should not be considered that the implementation goes beyond the scope of the embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product. When the computer program product is executed by a computer, a function of any one of the foregoing method embodiments is implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid-state drive (SSD)), or the like.

A person of ordinary skill in the art may understand that various reference numerals such as "first" and "second" in this application are merely used for differentiation for ease of description, and are not used to limit a scope of the embodiments of this application, or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-resource-unit transmission indication method, wherein the method comprises:
generating, by a first device, an extremely high throughput trigger-based physical layer protocol data unit (EHT TB PPDU), wherein the EHT TB PPDU comprises a resource unit indication field, the resource unit indication field indicates a first resource unit used by the first device to transmit the EHT TB PPDU, the first resource unit comprised in a second resource unit, and the second resource unit is one or more resource units allocated to the first device; and
sending, by the first device, the EHT TB PPDU to a second device by uplink.

2. The method according to claim 1, wherein the EHT TB PPDU comprises a universal signal (U-SIG) field, and the resource unit indication field is located in the U-SIG field of the EHT TB PPDU.

3. The method according to claim 1, wherein the EHT TB PPDU comprises a U-SIG, an extremely high throughput short training (EHT-STF) field, and an extremely high throughput signal (EHT-SIG) field, the resource unit indication field is located in the EHT-SIG field, and the EHT-SIG field is located between the U-SIG field and the EHT-STF field.

4. The method according to claim 1, wherein the EHT TB PPDU comprises an extremely high throughput long training (EHT-LTF) field, an extremely high throughput signal (EHT-SIG) field, and a data field, the resource unit indication field is located in the EHT-SIG field, and the EHT-SIG field is located between the EHT-LTF field and the data field.

5. The method according to claim 1, wherein before the generating, by a first device, the EHT TB PPDU, the method further comprises:
receiving, by the first device, a trigger frame sent by the second device, wherein the trigger frame comprises a common information field and a user information field that is the same as an association identifier of the first device, the user information field indicates the second resource unit, the common information field or the user information field comprises an indication field, and the indication field indicates that the first device is allowed to transmit the EHT TB PPDU in a part of the second resource unit.

6. The method according to claim 1, wherein the first device pre-stores an index table, and the index table indicates a correspondence between a value of the resource unit indication field and the first resource unit.

7. The method according to claim 1, wherein the first resource unit indicated by the resource unit indication field is any one of the following resource units:
a 26-subcarrier tone resource unit in an 80-MHz frequency band range;

a 52-tone resource unit in an 80-MHz frequency band range;

a 106-tone resource unit in an 80-MHz frequency band range;

a 242-tone resource unit in an 80-MHz frequency band range;

a 484-tone resource unit in an 80-MHz frequency band range; and a 996-tone resource unit corresponding to an 80-MHz frequency band range.

8. A communication apparatus, wherein the communication apparatus comprises a processor and a transmitter, wherein the processor is configured to generate an EHT TB PPDU, wherein the EHT TB PPDU comprises a resource unit indication field, the resource unit indication field indicates a first resource unit used by the communication apparatus to transmit the EHT TB PPDU, the first resource unit comprised in a second resource unit, and the second resource unit is one or more resource units allocated to the communication apparatus; and the transmitter is configured to send the EHT TB PPDU to a second device by uplink.

9. The communication apparatus according to claim 8, wherein the EHT TB PPDU comprises a U-SIG field, and the resource unit indication field is located in the U-SIG field of the EHT TB PPDU.

10. The communication apparatus according to claim 8, wherein the EHT TB PPDU comprises a U-SIG field, an EHT-STF field, and an EHT-SIG field, the resource unit indication field is located in the EHT-SIG field, and the EHT-SIG field is located between the U-SIG field and the EHT-STF field.

11. The communication apparatus according to claim 8, wherein the communication apparatus further comprises a memory, the memory stores an index table, and the index table indicates a correspondence between a value of the resource unit indication field and the first resource unit.

12. The communication apparatus according to claim 8, wherein the first resource unit indicated by the resource unit indication field is any one of the following resource units:

a 26-subcarrier tone resource unit in an 80-MHz frequency band range;

a 52-tone resource unit in an 80-MHz frequency band range;

a 106-tone resource unit in an 80-MHz frequency band range;

a 242-tone resource unit in an 80-MHz frequency band range;

a 484-tone resource unit in an 80-MHz frequency band range; and a 996-tone resource unit corresponding to an 80-MHz frequency band range.

13. The communication apparatus according to claim 12, wherein the EHT TB PPDU further comprises a frequency band range indication field, the frequency band range indication field indicates a frequency position of the 80-MHz frequency band range in a bandwidth, and the 80-MHz frequency band range is any one of the following: primary 80 MHz, secondary 80 MHz, 80 MHz having a lower frequency in secondary 160 MHz, and 80 MHz having a higher frequency in the secondary 160 MHz.

14. The communication apparatus according to claim 8, wherein the first resource unit indicated by the resource unit indication field is a plurality of resource units corresponding to any one of the following combinations:

a combination of a 106-tone resource unit having a lowest frequency in a 20-MHz frequency band range in an 80-MHz frequency band range and a center 26-tone resource unit in the 20-MHz frequency band range;

a combination of a 106-tone resource unit having a highest frequency in a 20-MHz frequency band range in an 80-MHz frequency band range and a center 26-tone resource unit in the 20-MHz frequency band range;

a combination of a 52-tone resource unit having a second lowest frequency in a 20-MHz frequency band range in an 80-MHz frequency band range and a 26-tone resource unit that is on a same side with and adjacent to the 52-tone resource unit and that is in the 20-MHz frequency band range;

a combination of a 52-tone resource unit having a second lowest frequency in a 20-MHz frequency band range in an 80-MHz frequency band range and a center 26-tone resource unit in the 20-MHz frequency band range;

a combination of a 52-tone resource unit having a second highest frequency in a 20-MHz frequency band range in an 80-MHz frequency band range and a continuous 26-tone resource unit that is on a same side with the 52-tone resource unit and that is in the 20-MHz frequency band range;

a combination of a 52-tone resource unit having a second highest frequency in a 20-MHz frequency band range in an 80-MHz frequency band range and a center 26-tone resource unit in the 20-MHz frequency band range;

a combination of a 484-tone resource unit in an 80-MHz frequency band range and a 242-tone resource unit adjacent to the 484-tone resource unit;

a combination of a 484-tone resource unit in an 80-MHz frequency band range and a 242-tone resource unit that is not adjacent to the 484-tone resource unit;

a combination of two 242-tone resource units on two sides in an 80-MHz frequency band range;

a combination of a 996-tone resource unit corresponding to an 80-MHz frequency band range and a 484-tone resource unit that is in an 80-MHz frequency band range adjacent to the 996-tone resource unit and that is not adjacent to the 996-tone resource unit;

a combination of a 996-tone resource unit corresponding to an 80-MHz frequency band range, and a 484-tone resource unit and a 242-tone resource unit that are in an 80-MHz frequency band range adjacent to the 996-tone resource unit and that are not adjacent to the 996-tone resource unit;

a combination of a 996-tone resource unit corresponding to an 80-MHz frequency band range, and two 242-tone resource units in an 80-MHz frequency band range adjacent to the 996-tone resource unit; and a combination of a 484-tone resource unit and a 242-tone resource unit in an 80-MHz frequency band range, and a 484-tone resource unit and a 242-tone resource unit in an 80-MHz frequency band range adjacent to the 80-MHz frequency band range.

15. The communication apparatus according to claim 8, wherein the first resource unit indicated by the resource unit indication field is a plurality of resource units corresponding to any one of the following combinations:

a combination of two 996-tone resource units in a 320-MHz frequency band range;

a combination of four 996-tone resource units in a 320-MHz frequency band range;

a combination of two 996-tone resource units having lowest frequencies and a 996-tone resource unit having a highest frequency in a 320-MHz frequency band range;

a combination of a 996-tone resource unit having a lowest frequency and two 996-tone resource units having highest frequencies in a 320-MHz frequency band range;

a combination of three 996-tone resource units having lowest frequencies in a 320-MHz frequency band range; and a combination of three 996-tone resource units having highest frequencies in a 320-MHz frequency band range.

16. The communication apparatus according to claim 8, wherein the resource unit indication field comprises bits of a first preset length, and a position of one of the bits in the bits corresponds to a position of a unit channel in a total channel; and when the one bit is a first value, the unit channel corresponding to the one bit is comprised in a channel corresponding to the first resource unit; and when the one bit is a second value, the unit channel corresponding to the one bit is not comprised in a channel corresponding to the first resource unit.

17. The communication apparatus according to claim 8, wherein the resource unit indication field comprises bits of a second preset length, and a position of one of the bits in the bits corresponds to a position of a unit channel in a frequency band range corresponding to the second resource unit; and when the one bit is a first value, the unit channel corresponding to the one bit is comprised in a channel corresponding to the first resource unit; and when the one bit is a second value, the unit channel corresponding to the one bit is not comprised in a channel corresponding to the first resource unit.

18. The communication apparatus according to claim 8, wherein the resource unit indication field comprises bits of a third preset length, and a position of one of the bits in the bits corresponds to a position of a resource unit in the second resource unit; and when the one bit is a first value, the resource unit corresponding to the one bit is comprised in the first resource unit; and when the one bit is a second value, the resource unit corresponding to the one bit is not comprised in the first resource unit.

19. A chip system, comprising at least one processor and an interface, wherein the processor is configured to generate an EHT TB PPDU, wherein the EHT TB PPDU comprises a resource unit indication field, the resource unit indication field indicates a first resource unit used by a communication apparatus to transmit the EHT TB PPDU, the first resource unit comprised in a second resource unit, and the second resource unit is one or more resource units allocated to the communication apparatus; and the interface is configured to send the EHT TB PPDU by uplink.

* * * * *